(12) United States Patent
Konda

(10) Patent No.: US 7,424,010 B2
(45) Date of Patent: Sep. 9, 2008

(54) STRICTLY NONBLOCKING MULTICAST MULTI-SPLIT LINEAR-TIME MULTI-STAGE NETWORKS

(75) Inventor: Venkat Konda, San Jose, CA (US)

(73) Assignee: TEAK Technologies, Inc., Santa Clara, CA (US)

( * ) Notice: Subject to any disclaimer, the term of this patent is extended or adjusted under 35 U.S.C. 154(b) by 786 days.

(21) Appl. No.: 10/933,900

(22) Filed: Sep. 5, 2004

(65) Prior Publication Data

US 2005/0053061 A1    Mar. 10, 2005

Related U.S. Application Data

(60) Provisional application No. 60/500,789, filed on Sep. 6, 2003, provisional application No. 60/500,790, filed on Sep. 6, 2003.

(51) Int. Cl.
*H04Q 11/00* (2006.01)
(52) U.S. Cl. .................. 370/388; 370/401; 340/2.22
(58) Field of Classification Search ................ 370/388, 370/401, 402; 340/2.22
See application file for complete search history.

(56) References Cited

U.S. PATENT DOCUMENTS

| | | | |
|---|---|---|---|
| 3,980,834 A | 9/1976 | Akiyama et al. | |
| 4,038,638 A | 7/1977 | Hwang | |
| 4,566,007 A | 1/1986 | Richards | |
| 5,023,864 A | 6/1991 | Cloonan et al. | |
| 5,179,551 A | 1/1993 | Turner | |
| 5,276,425 A | 1/1994 | Swanson et al. | |
| 5,291,477 A | 3/1994 | Liew | |
| 5,451,936 A | * 9/1995 | Yang et al. | ............ 340/2.22 |
| 5,544,160 A | 8/1996 | Cloonan et al. | |
| 5,801,641 A | 9/1998 | Yang et al. | |

OTHER PUBLICATIONS

V.E. Benes, "Mathematical Theory of Connecting Networks and Telephone Traffic" (Academic Press, 1965).

Y. Yang, and G.M., Masson, "Nonblocking Broadcast Switching Networks" IEEE Transactions on Computers, vol. 40, No. 9, Sep. 1991.

G. M. Masson & B. W. Jordan, "Generalized Multi-Stage Connection Networks" Networks, 2: pp. 191-209, 1972 by John Wiley and Sons, Inc.

F. K. Hwang, "Rearrangeability of Multi-Connection Three-Stage Clos Networks", Networks, 2: pp. 301-306, 1972 by John Wiley and Sons, Inc.

(Continued)

*Primary Examiner*—Hassan Kizou
*Assistant Examiner*—Bo Hui A Zhu
(74) *Attorney, Agent, or Firm*—Cooley Godward Kronish LLP

(57) ABSTRACT

In one embodiment, a controller is configured to establish a new multicast connection within a network without changing a path of an existing multicast connection within the network. The network can have an input stage having a total of at least $n_1 * r_1$ inlet links, an output stage including $r_2$ output switches, and $n_2$ outlet links for each of said $r_2$ output switches for a total of at least $n_2 * r_2$ outlet links, and a middle stage including m middle switches, where $m \geq s * Min(n_1, n_2)$ and where s=2 when $r_2 = [9,11]$, s=3 when $r_2 = [25,48]$, s=4 when $r_2 = [49,99]$, s=5 when $r_2 = [100,154]$, s=6 when $r_2 = [155,224]$, and s=7 when $r_2 = [225,278]$. The new multicast connection from an inlet link from the $n_1 * r_1$ inlet links passes through at most s middle switches.

18 Claims, 14 Drawing Sheets

OTHER PUBLICATIONS

Gaylord W. Richards and Frank K. Hwang, "A Two-Stage Rearrangeable Broadcast Switching Network". IEEE Transactions on Communications, vol. COM-33, No. 10, Oct. 1985, pp. 1025-.

Charles Clos "A Study of Non-Blocking Switching Networks", The Bell System Technical Journal, vol. XXXII, Jan. 1953, No. 1, pp. 406-424.

D.S. Kim, and D. Du, "Performance of Split Routing Algorithm for three-stage multicast networks", IEEE/ACM Transactions on Networking, vol. 8, No. 4, Aug. 2000.

F.K. Hwang, "Three-stage multiconnection networks which are nonblocking in the wide sense", The Bell systems technical journal, vol. 58, No. 10, Dec. 1979.

D. G. Cantor, "On Non-blocking Switching Networks", Networks, 1: pp. 367-377, 1972 by John Wiley and Sons, Inc.

F. K. Hwang and A. Jajszczyk, "On nonblocking multiconnection networks," IEEE Trans. Communications, vol. COM-34, pp. 1038-1041, 1986.

G. M. Masson, "Binomial switching networks for concentration and distribution," IEEE Trans. Communications, vol. Com-25, pp. 873-884, 1977.

G.M. Masson, "Upper Bounds on Fanout in Connection Networks", IEEE Transactions on Circuit Theory, vol. CT-20 No. 3, May 1973.

\* cited by examiner

STRICTLY NONBLOCKING MULTICAST MULTI-SPLIT LINEAR-TIME MULTI-STAGE NETWORKS

CROSS REFERENCE TO RELATED APPLICATIONS

This application is related to and claims priority of U.S. Provisional Patent Application Ser. No. 60/500,789, filed on 6 Sep. 2003. This application is U.S. Patent Application to and incorporates by reference in its entirety the related PCT Application PCT/US04/29027 entitled "STRICTLY NONBLOCKING MULTICAST MULTI-SPLIT LINEAR-TIME MULTI-STAGE NETWORKS" by Venkat Konda assigned to the same assignee as the current application, and filed concurrently.

This application is related to and incorporates by reference in its entirety the related U.S. patent application Ser. No. 09/967,815, filed on 27 Sep. 2001 and its Continuation In Part PCT Application Serial No. PCT/US 03/27971 filed 6 Sep. 2003. This application is related to and incorporates by reference in its entirety the related U.S. patent application Ser. No. 09/967,106, filed on 27 Sep. 2001 and its Continuation In Part PCT Application Serial No. PCT/US 03/27972, filed 6 Sep. 2003.

This application is related to and incorporates by reference in its entirety the related U.S. Provisional Patent Application Ser. No. 60/500,790, filed 6 Sep. 2003 and its U.S. patent application Ser. No. 10/933,899 as well as its PCT Application PCT/US04/29043 filed concurrently.

BACKGROUND OF INVENTION

As is well known in the art, a Clos switching network is a network of switches configured as a multi-stage network so that fewer switching points are necessary to implement connections between its inlet links (also called "inputs") and outlet links (also called "outputs") than would be required by a single stage (e.g. crossbar) switch having the same number of inputs and outputs. Clos networks are very popularly used in digital crossconnects, optical crossconnects, switch fabrics and parallel computer systems. However Clos networks may block some of the connection requests.

There are generally three types of nonblocking networks: strictly nonblocking; wide sense nonblocking; and rearrangeably nonblocking (See V. E. Benes, "Mathematical Theory of Connecting Networks and Telephone Traffic" Academic Press, 1965 that is incorporated by reference, as background). In a rearrangeably nonblocking network, a connection path is guaranteed as a result of the network's ability to rearrange prior connections as new incoming calls are received. In strictly nonblocking network, for any connection request from an inlet link to some set of outlet links, it is always possible to provide a connection path through the network to satisfy the request without disturbing other existing connections, and if more than one such path is available, any path can be selected without being concerned about realization of future potential connection requests. In wide-sense nonblocking networks, it is also always possible to provide a connection path through the network to satisfy the request without disturbing other existing connections, but in this case the path used to satisfy the connection request must be carefully selected so as to maintain the nonblocking connecting capability for future potential connection requests.

U.S. Pat. No. 5,451,936 entitled "Non-blocking Broadcast Network" granted to Yang et al. is incorporated by reference herein as background of the invention. This patent describes a number of well known nonblocking multi-stage switching network designs in the background section at column 1, line 22 to column 3, 59.

An article by Y. Yang, and G. M., Masson entitled, "Nonblocking Broadcast Switching Networks" IEEE Transactions on Computers, Vol. 40, No. 9, September 1991 that is incorporated by reference as background indicates that if the number of switches in the middle stage, m, of a three-stage network satisfies the relation $m \geq \min((n-1)(x+r^{1/x}))$ where $1 \leq x \leq \min(n-1,r)$, the resulting network is nonblocking for multicast assignments. In the relation, r is the number of switches in the input stage, and n is the number of inlet links in each input switch. Kim and Du (See D. S. Kim, and D. Du, "Performance of Split Routing Algorithm for three-stage multicast networks", IEEE/ACM Transactions on Networking, Vol. 8, No. 4, August 2000 incorporated herein by reference) studied the blocking probability for multicast connections for different scheduling algorithms.

SUMMARY OF INVENTION

A three-stage network is operated in strictly nonblocking manner in accordance with the invention includes an input stage having $r_1$ switches and $n_1$ inlet links for each of $r_1$ switches, an output stage having $r_2$ switches and $n_2$ outlet links for each of $r_2$ switches. The network also has a middle stage of m switches, and each middle switch has at least one link connected to each input switch for a total of at least $r_1$ first internal links and at least one link connected to each output switch for a total of at least $r_2$ second internal links, if $m \geq s*MIN(n_1,n_2)$ where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,2789].

In one embodiment, each multicast connection is set up through such a three-stage network by use of at most s middle stage switches. When the number of input stage $r_1$ switches is equal to the number of output stage $r_2$ switches, and $r_1=r_2=r$, and also when the number of inlet links in each input switch $n_1$ is equal to the number of outlet links in each output switch $n_2$, and $n_1=n_2=n$, a three-stage network is operated in strictly nonblocking manner in accordance with the invention if $m \geq s*n$ when s=2 when r=[9,11],
s=3 when r=[25,48],
s=4 when r=[49,99],
s=5 when r=[100,154],
s=6 when r=[155,224], and
s=7 when r=[225,278].

In one embodiment, each multicast connection is set up through such a three-stage network by use of at most s middle stage switches.

DETAILED DESCRIPTION OF THE INVENTION

The present invention is concerned with the design and operation of multi-stage switching networks for broadcast, unicast and multicast connections. When a transmitting device simultaneously sends information to more than one receiving device, the one-to-many connection required between the transmitting device and the receiving devices is called a multicast connection. A set of multicast connections is referred to as a multicast assignment. When a transmitting device sends information to one receiving device, the one-to-one connection required between the transmitting device and the receiving device is called unicast connection. When a transmitting device simultaneously sends information to all the available receiving devices, the one-to-all connection required between the transmitting device and the receiving devices is called a broadcast connection.

In general, a multicast connection is meant to be one-to-many connection, which includes unicast and broadcast connections. A multicast assignment in a switching network is nonblocking if any of the available inlet links can always be connected to any of the available outlet links. In certain multi-stage networks of the type described herein, any connection request of arbitrary fan-out (denoted as f), i.e. from an inlet link to an outlet link or to a set of outlet links of the network, can be satisfied without blocking with never needing to rearrange any of the previous connection requests. Depending on the number of switches in a middle stage of such a network, such connection requests may be satisfied without blocking if necessary by rearranging some of the previous connection requests as described in detail in U.S. patent application Ser. No. 09/967,815 that is incorporated by reference above. Depending on the number of switches in a middle stage of such a network and a scheduling method of time complexity $O(m^2)$, such connection requests may be satisfied even without rearranging as described in detail in U.S. patent application Ser. No. 09/967,106 that is incorporated by reference above. Depending on the number of switches in a middle stage of such a network and a scheduling method of time complexity O(m), such connection requests may be satisfied even without rearranging as described in detail in U.S. patent application Ser. No. 10/922,899 that is incorporated by reference above.

Figure 1A:
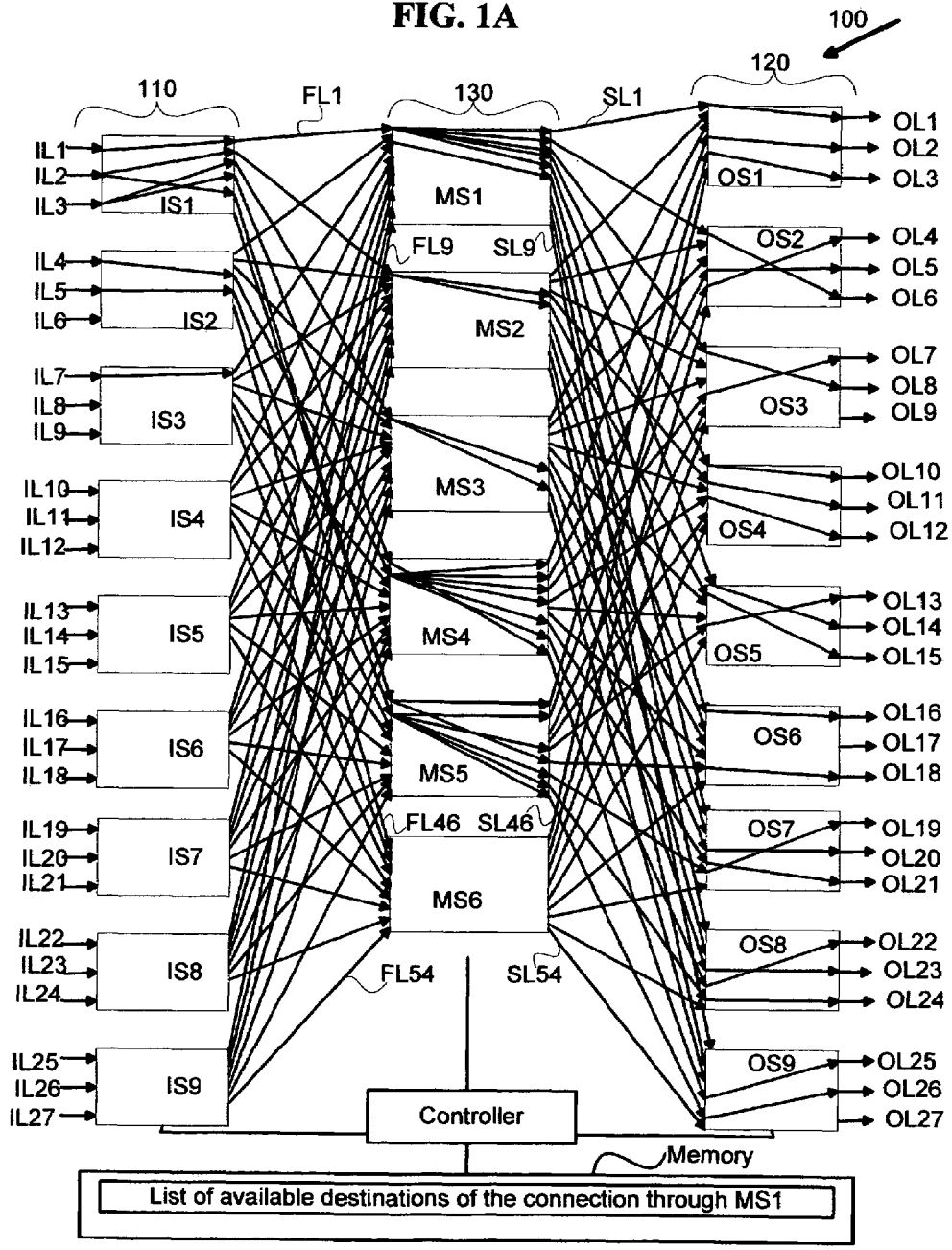
FIG. 1A is a diagram of an exemplary three-stage symmetrical network with exemplary multicast connections in accordance with the invention.

Referring to FIG. 1A, an exemplary symmetrical three-stage Clos network of twenty four switches for satisfying communication requests, such as setting up a telephone call or a data packet connection, between an input stage 110 and output stage 120 via a middle stage 130 is shown where input stage 110 consists of nine, three by six switches IS1-IS9 and output stage 120 consists of nine, six by three switches OS1-OS9, and middle stage 130 consists of six, nine by nine switches MS1-MS6. Such a network can be operated in strictly non-blocking manner, because the number of switches in the middle stage 130 (i.e. six switches) is equal to s*n, where the n is the number of links (i.e. three inlet links) of each of the switches in the input stage 110 and output stage 120, and s=2 in FIG. 1A. The specific method used in implementing the strictly non-blocking connectivity can be any of a number of different methods that will be apparent to a skilled person in view of the disclosure. One such method is described below in reference to FIG. 1B.

In one embodiment of this network each of the input switches IS1-IS9 and output switches OS1-OS9 are single-stage switches. When the number of stages of the network is one, the switching network is called single-stage switching network, crossbar switching network or more simply crossbar switch. A (N*M) crossbar switching network with N inlet links and M outlet links is composed of NM cross points. As the values of N and M get larger, the cost of making such a crossbar switching network becomes prohibitively expensive. In another embodiment of the network in FIG. 1A each of the input switches IS1-IS9 and output switches OS1-OS9 are shared memory switches.

The number of switches of input stage 110 and of output stage 120 can be denoted in general with the variable r for each stage. The number of middle switches is denoted by m. The size of each input switch IS1-IS9 can be denoted in general with the notation n*m and of each output switch OS1-OS9 can be denoted in general with the notation m*n. Likewise, the size of each middle switch MS1-MS6 can be denoted as r*r. A switch as used herein can be either a crossbar switch, or a network of switches each of which in turn may be a crossbar switch or a network of switches. A three-stage network can be represented with the notation V(m,n,r), where n represents the number of inlet links to each input switch (for example the links IL1-IL3 for the input switch IS1) and m represents the number of middle switches MS1-MS6. Although it is not necessary that there be the same number of inlet links IL1-IL27 as there are outlet links OL1-OL27, in a symmetrical network they are the same. Each of the m middle switches MS1-MS6 are connected to each of the r input switches through r links (hereinafter "first internal" links, for example the links FL1-FL9 connected to the middle switch MS1 from each of the input switch IS1-IS9), and connected to each of the output switches through r second internal links (hereinafter "second internal" links, for example the links SL1-SL9 connected from the middle switch MS1 to each of the output switch OS1-OS9).

Each of the first internal links FL1-FL54 and second internal links SL1-SL54 are either available for use by a new connection or not available if currently used by an existing connection. The input switches IS1-IS9 are also referred to as the network input ports. The input stage 110 is often referred to as the first stage. The output switches OS1-OS9 are also referred to as the network output ports. The output stage 120 is often referred to as the last stage. In a three-stage network, the second stage 130 is referred to as the middle stage. The middle stage switches MS1-MS6 are referred to as middle switches or middle ports.

In one embodiment, the network also includes a controller coupled with each of the input stage 110, output stage 120 and middle stage 130 to form connections between an inlet link IL1-IL27 and an arbitrary number of outlet links OL1-OL27. In this embodiment the controller maintains in memory a list of available destinations for the connection through a middle switch (e.g. MS1 in FIG. 1A). In a similar manner a set of n lists are maintained in an embodiment of the controller that uses a fan-out of n.

A multicast connection may be set up to all its designated destinations through one or more middle switches. When the multicast connection is routed through more than one middle switch it is called the multicast connection is fan-out-split to set up the connection.

Figure 1B:
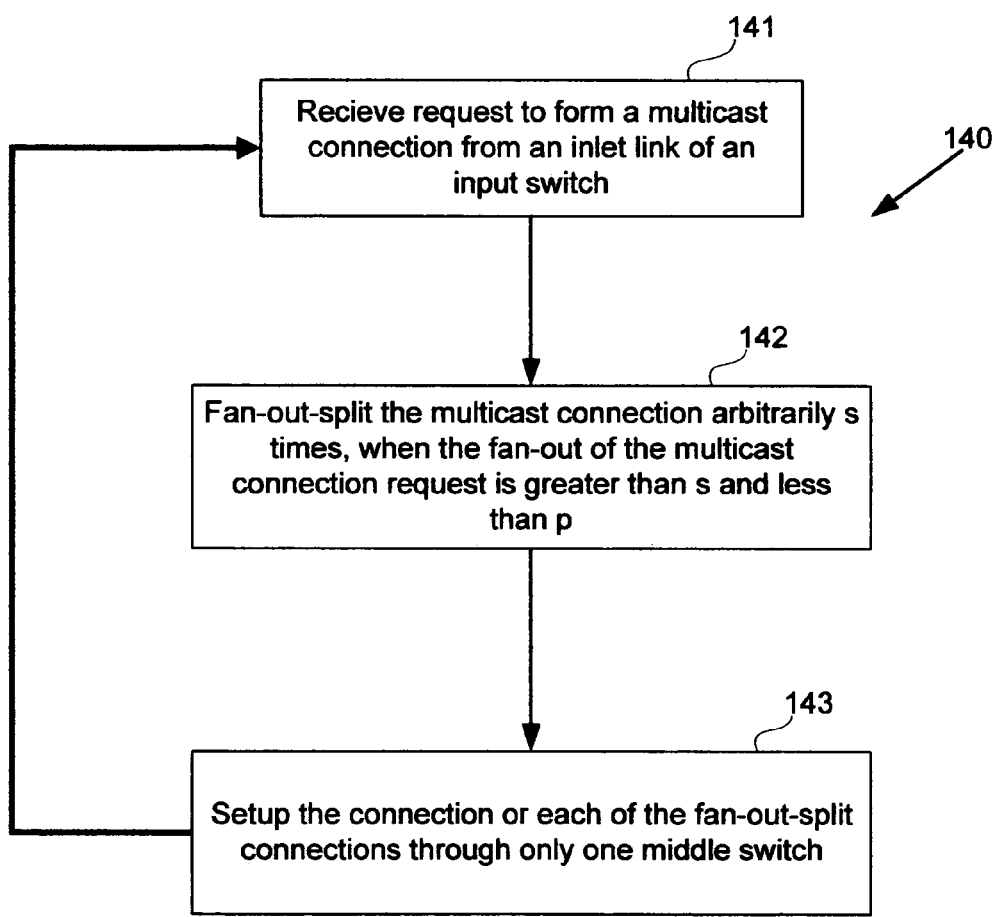
FIG. 1B is high-level flowchart of a scheduling method according to the invention, used to set up the multicast connections in the network 100 of FIG. 1A.

FIG. 1B shows a high-level flowchart of a scheduling method 140, in one embodiment executed by the controller of FIG. 1A. According to this embodiment, a multicast connection request is received in act 141. Then in act 142, the connection request is fan-out-split if the fan-out of the connection is >s and <p, (For the network 100 of FIG. 1A, $$p = \frac{r}{s},$$

the determination of the value of p for a V(m,n,r) network is discussed later) according to the current invention. Finally the request is set up in act 143 by fanning out into only one switch in middle stage 130 from its input switch if it is not fan-out-split. Otherwise the connection request is set up through at most s middle switches by fanning out at most s times in the input switch, i.e., at most one middle switch for each fan-out-split connection.

In the example illustrated in FIG. 1A, different fan-out in the input switch is used to satisfy each multicast connection request based on the fan-out of the request. The specific middle switch that is chosen when selecting the fan-out is irrelevant to the method of FIG. 1B so long as the required number of middle switch is selected to ensure that the connection request is satisfied, i.e. the destination switches identified by the connection request can be reached from the middle switches that is part of the selected fan-out. In essence, limiting the fan-out from input switch to at most s middle switches permits the network 100 to be operated in strictly nonblocking manner in accordance with the invention.

After act 143, the control is returned to act 141 so that acts 141, 142 and 143 are executed in a loop for each multicast connection request. According to one embodiment as shown further below it is not necessary to have more than 2*n middle stage switches in network 100 of the FIG. 1A, where the number of inlet links IL1-IL3 equals the number of outlet links OL1-OL3, both represented by the variable n and where the number of switches IS1-IS9 in the input stage 110 equals the number of switches OS1-OS9 in the output stage 120, both represented by the variable r for the network to be a strictly nonblocking symmetrical switching network, when the scheduling method of FIG. 1B is used.

The connection request of the type described above in reference to method 140 of FIG. 1B can be unicast connection request, a multicast connection request or a broadcast connection request, depending on the example. In all the three cases of connection requests, a fan-out of not more than s in the input switch is used. Moreover, although in the above-described embodiment a limit of s has been placed on the fan-out into the middle stage switches, the limit can be greater depending on the number of middle stage switches in a network, as discussed below in reference to FIG. 2A (while maintaining the strictly nonblocking nature of operation of the network). Moreover, in method 140 described above in reference to FIG. 1B any arbitrary fan-out may be used between each middle stage switch and the output stage switches, and also any arbitrary fan-out may be used within each output stage switch, to satisfy the connection request. Moreover, although method 140 of FIG. 1B has been illustrated with examples in a twenty-four switch network 100 of FIG. 1A, the method 140 can be used with any general network, of the type illustrated in FIG. 2A and FIG. 2B.

Figure 2A:
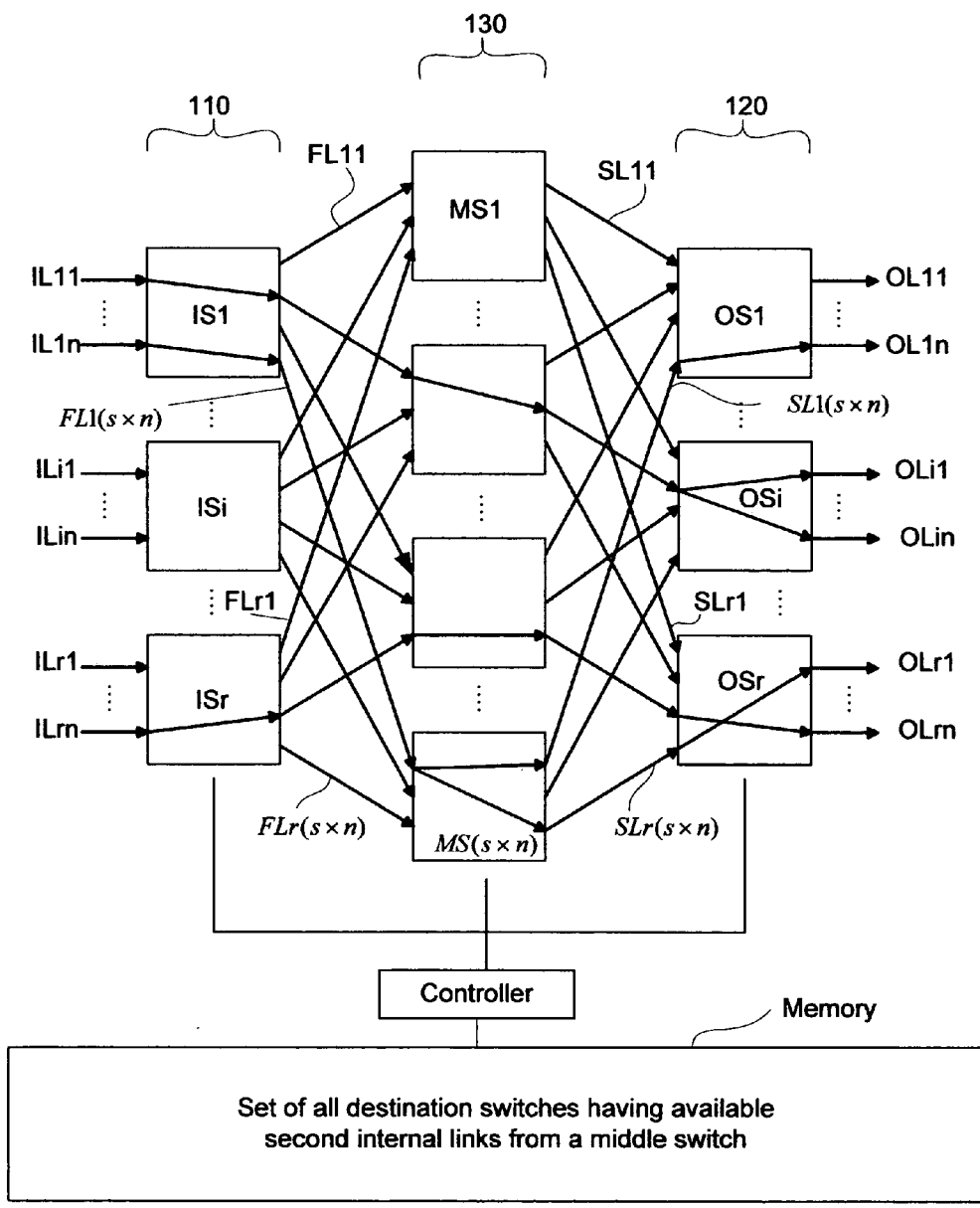
FIG. 2A is a diagram of a general symmetrical three-stage strictly nonblocking network with n inlet links in each of r input stage switches and s*n middle stage switches {Where s=2 when r=[9,11]; s=3 when r=[25,48]; s=4 when r=[49,99]; s=5 when r=[100,154]; s=6 when r=[155,224], and s=7 when r=[225,278]} that are used with the method of FIG. 1B in one embodiment.

Network of FIG. 1A is an example of general symmetrical three-stage network shown in FIG. 2A. The general symmetrical three-stage network can be operated in strictly nonblocking manner if m≧s*n where
   s=2 when r=[9,11],
   s=3 when r=[25,48],
   s=4 when r=[49,99],
   s=5 when r=[100,154],
   s=6 when r=[155,224], and
   s=7 when r=[225,278], wherein network FIG. 2A has n inlet links for each of r input switches IS1-ISr (for example the links IL11-IL1n to the input switch IS1) and n outlet links for each of r output switches OS1-OSr (for example OL11-OL1n to the output switch OS1). Each of the m switches MS1-MSm are connected to each of the input switches through r first internal links (for example the links FL11-FLr1 connected to the middle switch MS1 from each of the input switch IS1-ISr), and connected to each of the output switches through r second internal links (for example the links SL11-SLr1 connected from the middle switch MS1 to each of the output switch OS1-OSr). In such a general symmetrical network no more than s*n middle stage switches {where s=2 when r=[9,11]; s=3 when r=[25,48]; s=4 when r=[49,99]; s=5 when r=[100, 154]; s=6 when r=[155,224], and s=7 when r=[225,278]} MS-MS(s*n) are necessary for the network to be operable in strictly nonblocking manner, when using a scheduling method of the type illustrated in FIG. 1B. Although FIG. 2A shows an equal number of first internal links and second internal links, as is the case for a symmetrical three-stage network, the present invention, however, applies even to non-symmetrical networks of the type illustrated in FIG. 2B (described next).

Figure 2B:
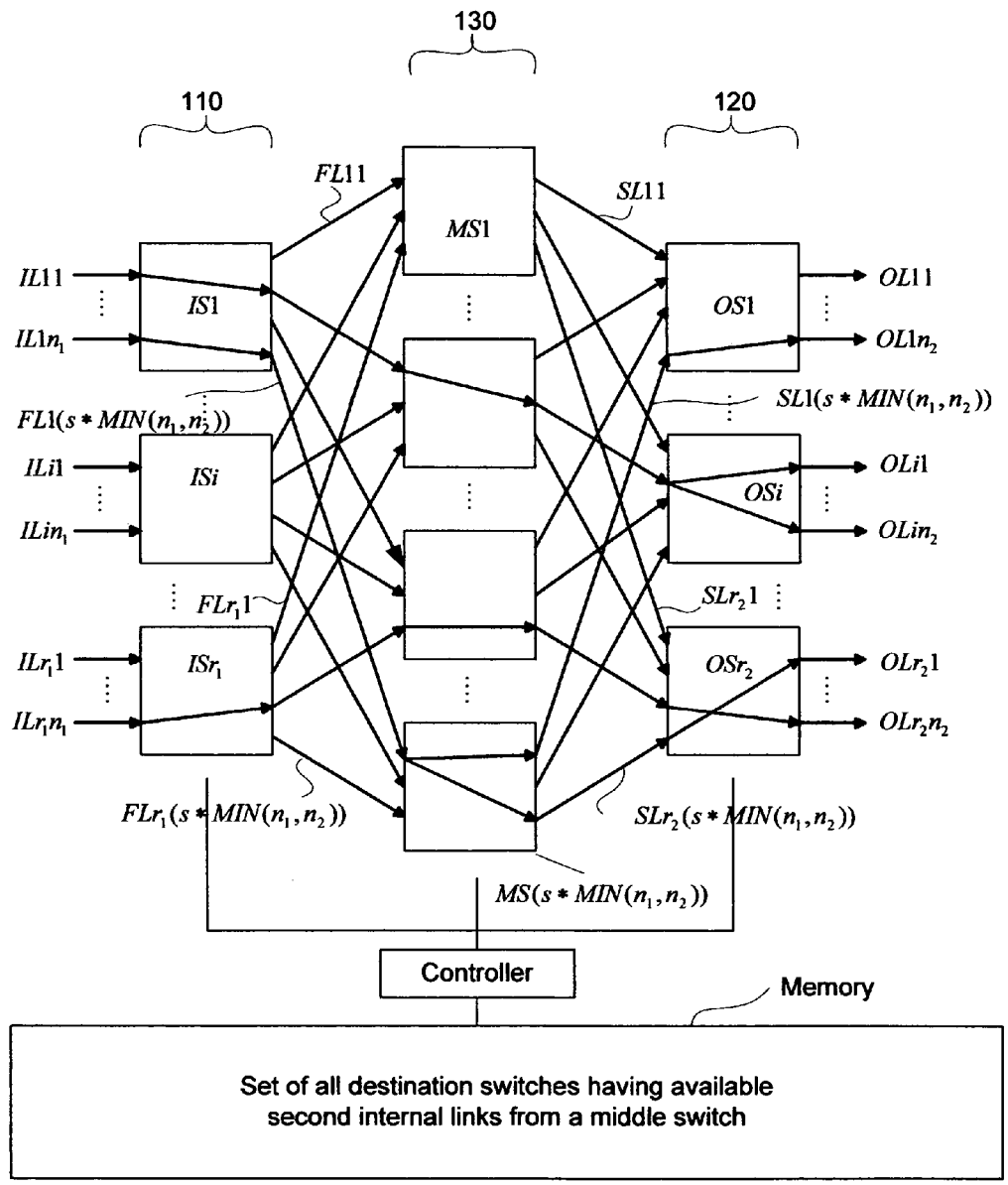
FIG. 2B is a diagram of a general non-symmetrical three-stage strictly nonblocking network with $n_1$ inlet links in each of $r_1$ input stage switches, $n_2$ outlet links in each of $r_2$ output stage switches, and s*$n_1$ middle stage switches {Where s=2 when $r_2$=[9,11]; s=3 when $r_2$=[25,48]; s=4 when $r_2$=[49,99]; s=5 when $r_2$=[100,154]; s=6 when $r_2$=[155,224], and s=7 when $r_2$=[225,278]} that are used with the method of FIG. 1B in one embodiment.

In general, an $(N_1*N_2)$ asymmetric network of three stages can be operated in strictly nonblocking manner if m≧s*MIN $(n_1,n_2)$ where
   s=2 when $r_2$=[9,11],
   s=3 when $r_2$=[25,48],
   s=4 when $r_2$=[49,99],
   s=5 when $r_2$=[100,154],
   s=6 when $r_2$=[155,224], and
   s=7 when $r_2$=[225,278], wherein network (FIG. 2B) has $r_1$ ($n_1*m$) switches IS1-IS$r_1$ in the first stage, m ($r_1*r_2$) switches MS1-MSm in the middle stage, and $r_2$ ($m*n_2$) switches OS1-OS$r_2$ in the last stage where $N_1=n_1*r_1$ is the total number of inlet links and $N_2=n_2*r_2$ is the total number of outlet links of the network. Each of the m switches MS1-MS(s*MIN($n_1,n_2$)) are connected to each of the input switches through $r_1$ first internal links (for example the links FL11-FL$r_1$1 connected to the middle switch MS1 from each of the input switch IS1-IS$r_1$), and connected to each of the output switches through $r_2$ second internal links (for example the links SL11-SL$r_2$1 connected from the middle switch MS1 to each of the output switch OS1-OS$r_2$). Such a multi-stage switching network is denoted as a V($m,n_1,r_1,n_2,r_2$) network. For the special symmetrical case where $n_1=n_2=n$ and $r_1=r_2=r$, the three-stage network is denoted as a V(m,n,r) network. In general, the set of inlet links is denoted as $\{1,2,\ldots,r_1,n_1\}$ and the set of output switches are denoted as O=$\{1,2,\ldots,r_2\}$. In an asymmetrical three-stage network, as shown in FIG. 2B with $n_1$ inlet links for each of $r_1$ input switches, $n_2$ outlet links for each of $r_2$ output switches, no more than m≧s*MIN($n_1,n_2$) where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278].

middle stage switches are necessary for the network to be strictly nonblocking, again when using the scheduling method of FIG. 1B. The network has all connections set up such that each connection passes through at most s middle switches to be connected to all destination outlet links.

TABLE 1

A Multicast Assignment in a V(6, 3, 9) Network

| Requests for r = 1 | Requests for r = 2 | Requests for r = 3 |
|---|---|---|
| $I_1$ = {1, 2, 3, 4, 5} | $I_4$ = {1, 2, 3, 4, 7, 8} | $I_7$ = {6} |
| $I_2$ = {1, 4, 5, 6} | $I_5$ = {2, 5, 7, 8, 9} | |
| $I_3$ = {7, 8, 9} | | |

In one embodiment every switch in the multi-stage networks discussed herein has multicast capability. In a V($m,n_1,r_1,n_2,r_2$) network, if a network inlet link is to be connected to more than one outlet link on the same output switch, then it is only necessary for the corresponding input switch to have one path to that output switch. This follows because that path can be multicast within the output switch to as many outlet links as necessary. Multicast assignments can therefore be described in terms of connections between input switches and output switches. An existing connection or a new connection from an input switch to r' output switches is said to have fan-out r'. If all multicast assignments of a first type, wherein any inlet link of an input switch is to be connected in an output switch to at most one outlet link are realizable, then multicast assignments of a second type, wherein any inlet link of each input switch is to be connected to more than one outlet link in the same output switch, can also be realized. For this reason, the following discussion is limited to general multicast connections of the first type (with fan-out r', 1≦r'≦$r_2$) although the same discussion is applicable to the second type.

To characterize a multicast assignment, for each inlet link i∈$\{1,2,\ldots,r_1,n_1\}$, let $I_i$=O, where O ⊂ $\{1,2,\ldots,r_2\}$, denote the subset of output switches to which inlet link i is to be connected in the multicast assignment. For example, the network of FIG. 1A shows an exemplary three-stage network, namely V(6,3,9), with the multicast assignment shown in Table 1. This network has a total of twenty-seven inlet links and twenty-seven outlet links. The multicast assignment in Table 1 shows six multicast connections. Each of the six connections has different fan-out. For example, the connection request $I_1$ has the destinations as the output switches OS1, OS2, OS3, OS4, and OS5 (referred to as 1, 2, 3, 4, 5 in Table 1). Request $I_1$ only shows the output switches and does not show which outlet links are the destinations. However it can be observed that none of the output switches is used more than three times in the multicast assignment of Table 1. For example, output switch 1 is used in requests $I_1$, $I_2$, $I_4$, so that all three outlet links of output switch 1 are in use, and a specific identification of each outlet link is irrelevant.

In FIG. 1A, it should be noted that the connection $I_1$ fans out in the first stage switch IS1 into the middle stage switch MS1 since the fan-out of the connection is $$5 > \frac{9}{2};$$

and fans out in middle switch MS1 into output switches OS1, OS2, OS3, OS4, and OS5. The connection $I_1$ also fans out in the last stage switches OS1, OS2, OS3, OS4, and OS5 into one of the outlet link of the three outlet links in each of the output switches. The connection $I_2$ fans out twice in the input switch IS1 into middle switches MS2 and MS5 since the fan-out of the connection is 4>2 and $$4 < \frac{9}{2};$$

and fans out in the middle stage switches MS2 and MS5 into the last stage switch {OS4, OS5} and {OS6, OS1} respectively. The connection $I_2$ fans out once in the output switches OS4, OS5, OS6, and OS1 into one of the outlet links in each of the output switches. The connection $I_3$ fans out twice in the input switch IS1 into middle switches MS3 and MS4 since the fan-out of the connection is 3>2 and $$3 < \frac{9}{2};$$

and fans out in the middle stage switches MS3 and MS4 into the last stage switch {OS7, OS8} and {OS9} respectively. The connection $I_3$ fans out once in the output switches OS7, OS8, and OS9 into one of the outlet links in each of the output switches.

In FIG. 1A, the connection $I_4$ fans out once in the input switch IS2 into middle switch MS4 since the fan-out of the connection is $$6 > \frac{9}{2};$$

and fans out in the middle stage switch MS4 into the last stage switch OS1, OS2, OS3, OS4, OS7, and OS8 respectively. The connection $I_4$ fans out once in the output switches OS1, OS2, OS3, OS4, OS7, and OS8 into one of the outlet links in each of the output switches. The connection $I_5$ fans out once in the input switch IS2 into middle switch MS5 since the fan-out of the connection is $$5 > \frac{9}{2};$$

and fans out in the middle stage switch MS5 into the last stage switch OS2, OS5, OS7, OS8, and OS9 respectively. The connection $I_5$ fans out once in the output switches OS2, OS5, OS7, OS8, and OS9 into one of the outlet links in each of the output switches. The connection $I_7$ fans out once in the input switch IS3 into middle switch MS1 since it is unicast connection; and fans out in the middle stage switch MS1 into the last stage switch OS6. The connection $I_7$ fans out once in the output switch OS6 into one of the outlet links in each of the output switches. In accordance with the invention, each connection can fan out in the first stage switch into s middle stage switches, and in the middle switches and last stage switches it can fan out any arbitrary number of times as required by the connection request.

Two multicast connection requests $I_i = O_i$ and $I_j = O_j$ for $i \neq j$ are said to be compatible if and only if $O_i \cap O_j = \phi$. It means when the requests $I_i$ and $I_j$ are compatible, and if the inlet links i and j do not belong to the same input switch, they can be set up through the same middle switch.

Figure 3A:
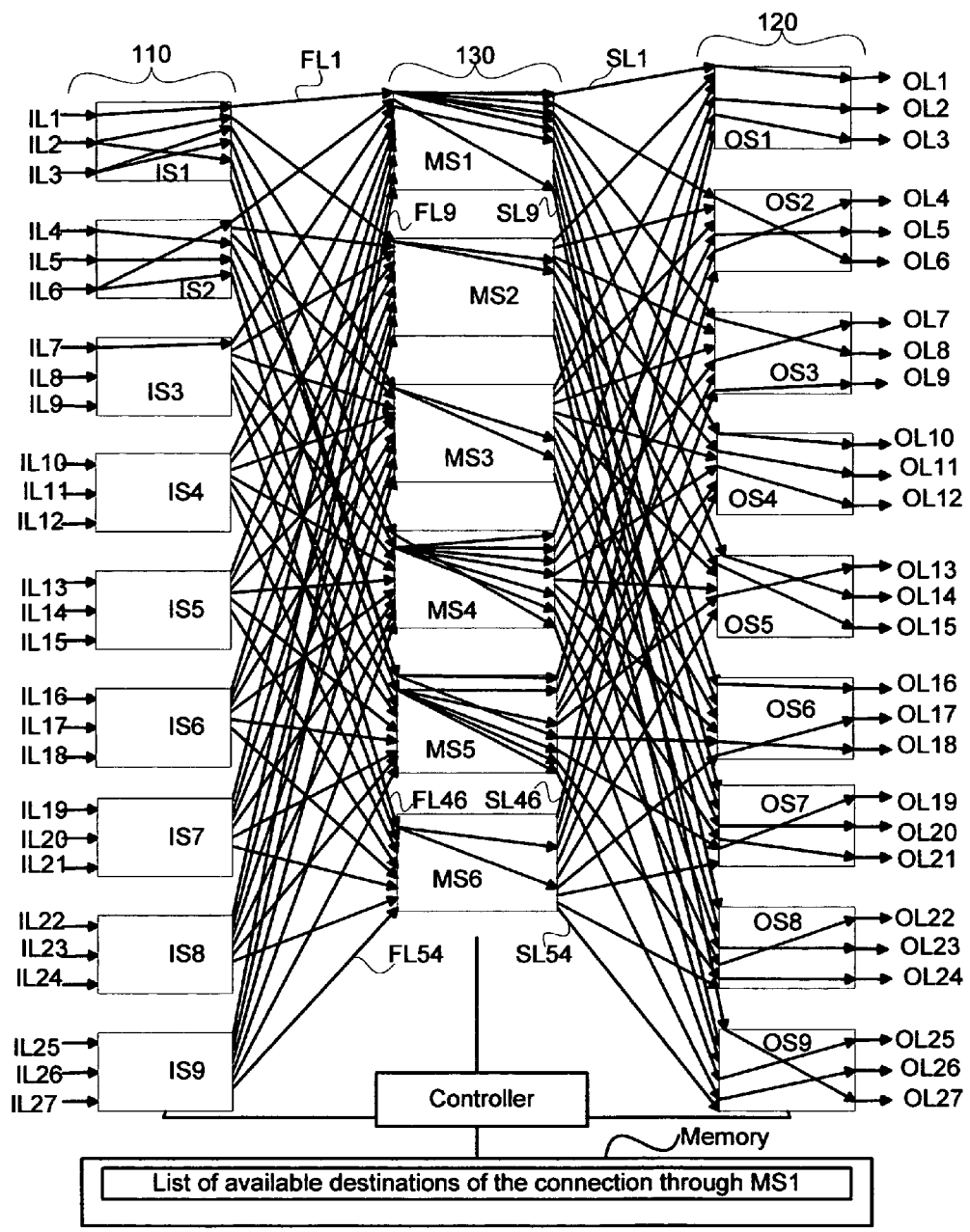
FIG. 3A shows the network of FIG. 1A after a new connection is set up by selecting two middle switches in the network, using the method of FIG. 1B in one implementation.

FIG. 3A shows the state of the V(6,3,9) network of FIG. 1A after the connection request $I_6 = \{3,6,9\}$ is set up. Method 140 of FIG. 1B next sets up a connection $I_6$ from input switch IS2 to output switches OS3, OS6 and OS9 as follows. In act 142 the scheduling method of FIG. 1B finds that, since the fan-out of the connection request $I_6$ is 3, it is fan-out-split arbitrarily into two fan-out-split connections, the first with destinations switches as OS3 and OS6, and the second with destination switch as OS9. Then the control transfers to act 143, where each of these two fan-out-split connections is independently set up. As shown in FIG. 3A the connection $I_6$ is fanned out in the input switch IS2 twice to middle switches MS6 and MS1. In the middle switch MS6 it is fanned out twice into the output switches OS3 and OS6 and in the middle switch MS1 it is fanned out once into the output switch OS9. In the output switches OS3, OS6 and OS9, the connection $I_6$ is fanned out into the destined outlet link.

Figure 4A:
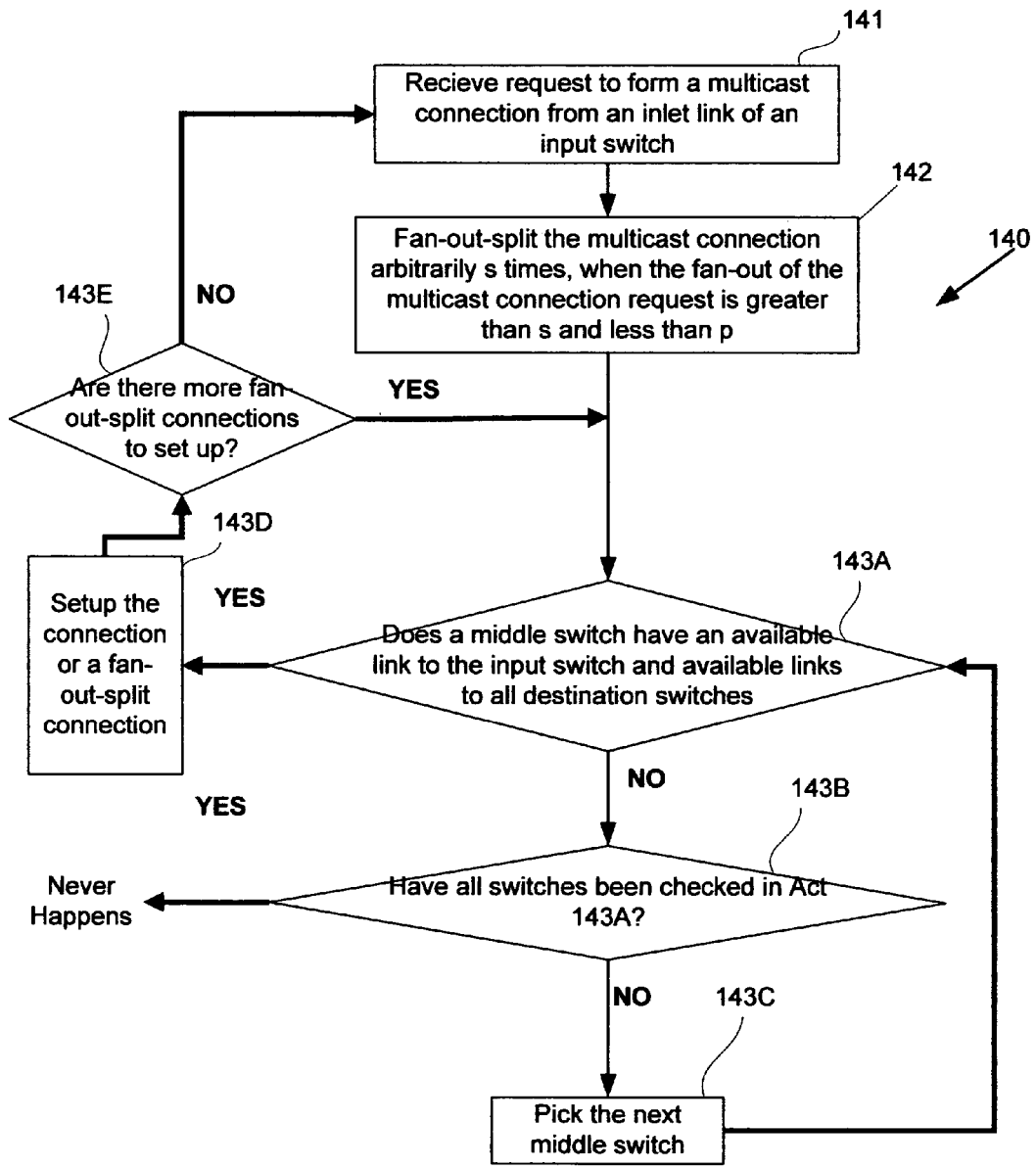
FIG. 4A is intermediate level flowchart of one implementation of the act 142 of FIG. 1B.
Figure 4B:
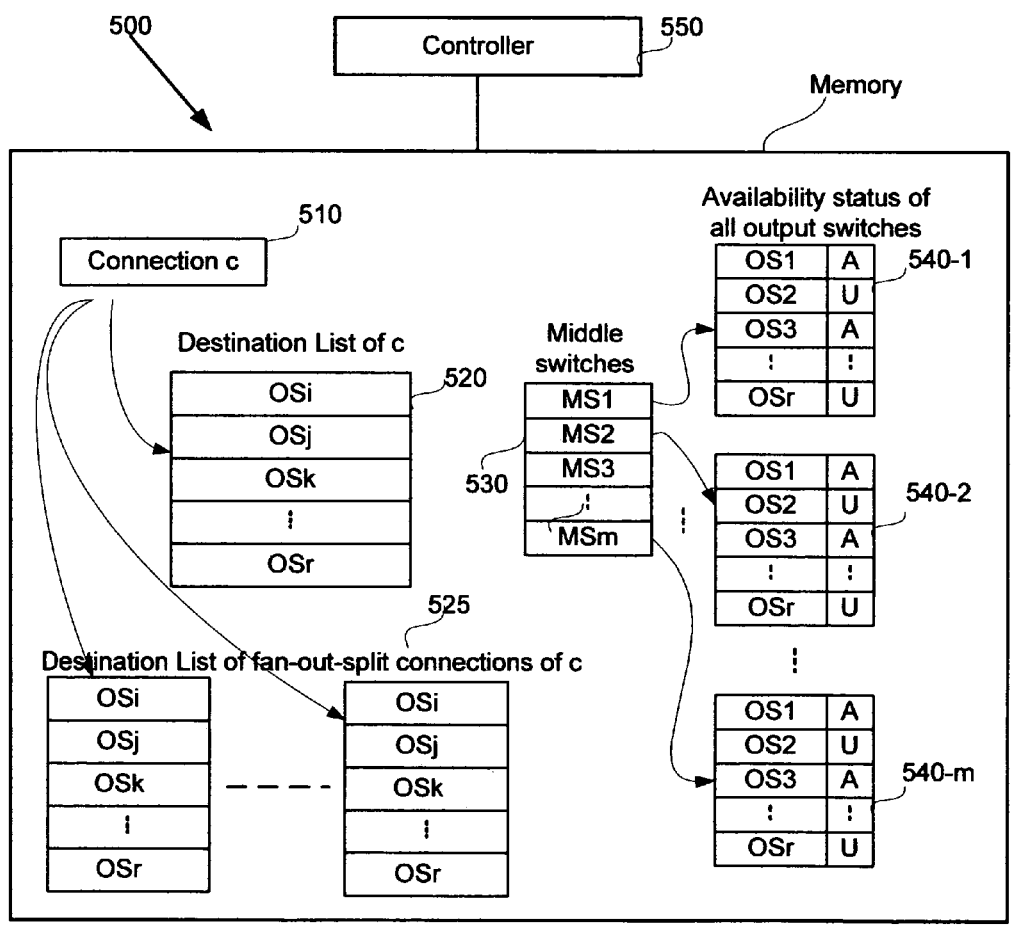
FIG. 4B implements, in one embodiment, the data structures used to store and retrieve data from memory of a controller that implements the method of FIG. 4A.

FIG. 4A is an intermediate-level flowchart of one variant of act 140 of FIG. 1B. Act 142 of FIG. 1B fan-out-splits the connection arbitrarily s times, if the fan-out of the connection is >s and <p. Act 143 of FIG. 1B is implemented in one embodiment by acts 143A-143E as illustrated in FIG. 4A. Act 143A checks if a middle switch has an available link to the input switch, and also has available links to all the required destination switches. In act 143B, the method of FIG. 4A checks if all middle switches has been checked in 143A. As illustrated in FIG. 4B, act 143B is reached when the decision in act 143A is "no". If act 143B results in "no", the control goes to act 143C where the next middle switch is selected and the control transfers to act 143A. But act 143B never results in "yes" which means the method of FIG. 4A always finds one middle switch to set up the connection. When act 143A results in "yes" the connection is set up or the fan-out-split connection is set up. Then control transfers to act 143E, where it is checked if all the fan-out-split connections are set up. If act 143E results in "no", the control transfers to act 143A to set up the next fan-out-split connection. If act 143E results in "yes", i.e., all the fan-out-split connections are set up, the control transfers to act 141.

In a three-stage network of FIG. 2B with $n_1$ inlet links for each of $r_1$ input switches, $n_2$ outlet links for each of $r_2$ output switches, no more than $m \geq s*MIN(n_1,n_2)$ where s=2 when $r_2$=[9,11], s=3 when $r_2$=[25,48], s=4 when $r_2$=[49,99], s=5 when $r_2$=[100,154], s=6 when $r_2$=[155,224], and s=7 when $r_2$=[225,278], middle stage switches are necessary for the network to be strictly nonblocking and hence also for the method of FIG. 4A to always find one middle switch to set up the connection.

And the following method illustrates the psuedo code for one implementation of the scheduling method of FIG. 4A to always set up a new multicast connection request through the network of FIG. 2B, when there are as many middle switches in the network as discussed in the invention.

Pseudo Code of the Scheduling Method:

```
Step 1:    c = current connection request; L = Set of all destination switches of c;
Step 2:    f = Number of destination switches of c;
Step 3:    if ((f > s) and (f < p)) {
Step 4:        for i = 1 to s do {

Step 5:            O[i] = set of any unmarked ⌈f/s⌉ destination switches of c;

Step 6:            Mark the used destination switches of c;
Step 7:        }
           } else O[1] = L ;
Step 8:    for j = 1 to s do {
Step 9:        if(O[j] ≠ NULL) {
Step 10:           for i = mid_switch_1 to mid_switch_m do {
Step 11:               if(c has no available link to i) continue;
Step 12:               A_i = Set of all destination switches having available links from i ;

Step 13:               if (O[j] ⊆ A_i) {
```

-continued

```
                Set up fan-out-split connection j of connection c
                through i for all the destination switches in Set O[j];
                Mark all the used links to and from i as unavailable;
              }
            }
          }
        }
Step 14: return ("SUCCESS");
```

Step 1 above labels the current connection request as "c" and also labels the set of the destination switches of c as "L". Step 2 assigns the fan-out of "c" to f. Step 3 checks if fan-out-splitting of "c" is required; i.e., if (f>s) and (f<p) then "c" is fan-out-split. (The determination of the values of s and p, which is discussed next, is fed in as input constants to the method). Step 4 starts a loop to create s number of fan-out-split connections of "c". Step 5 arbitrarily assigns $$\left\lceil \frac{f}{s} \right\rceil$$

destination switches of "c" to each constituent fan-out-split connections into O[i] for i=1 to s. Step 6 marks the already assigned destination switches so that they are not assigned to another fan-out-split connection. When the fan-out-split is not performed for a connection, O[1] is set to all the destination switches of "c". Step 8 starts a loop to set up each connection or fan-out-split connections of the connection. Step 9 checks if the corresponding set O[i] is not NULL then Step 10 starts a loop and steps through all the middle switches.

If the input switch of c has no available link to the middle switch i, Step 11 continues so that next middle switch is selected as i. Step 12 determines the set of destination switches of fan-out-split connection j having available links from middle switch i. In Step 13 if middle switch i has available links to all the destination switches of fan-out-split connection j, connection j is set up through middle switch i. And all the used links of middle switch i to output switches are marked as unavailable for future requests. These steps are repeated for all the middle switches. One middle switch can always be found for each fan-out-split connection j to be set up, according to the current invention. So Step 14 always returns the control with "SUCCESS". It is easy to observe that the number of steps performed by the scheduling method is proportional to s×m, where m is the number of middle switches in the network. Since s is a constant, the scheduling method is of time complexity O(m).

FIG. 4B illustrates, in one embodiment, the data structures used to store and retrieve data from memory of a controller that implements the method of FIG. 4A. In this embodiment, a fan-out of one or more in the input switch of each connection is implemented by use of two data structures (such as arrays or linked lists) to indicate the destinations that can be reached from one middle switch. Each connection request 510, when it is not fan-out-split, is specified by an array 520 of destination switch identifiers (and also an inlet link of an input switch identifier). When connection request 510 is fan-out-split, s number of arrays 525 represent with one array denoting the destination switches for each fan-out-split connection. Another array 530 of middle switches contains m elements one each for all the middle switches of the network. Each element of array 530 has a pointer to one of m arrays, 540-1 to 540-m, containing bits that indicate availability status (hereinafter availability status bit) for each output switch OS1-OSr as shown in FIG. 4B. If second internal link to an output switch is available from a middle switch, the corresponding bit in the availability status array is set to 'A' (to denote available, i.e. unused link) as shown in FIG. 4B. Otherwise the corresponding bit is set to 'U' (to denote unavailable, i.e. used link).

For each connection 510, depending on if it is fan-out-split or not, each middle switch MSi is checked to see if the destinations of each fan-out-split connection of the connection 510 are reachable from MSi. Specifically this condition is checked by using the availability status arrays 540-i of middle switch MSi, to determine the available destinations of the fan-out-split connection from MSi. In one implementation, each destination is checked if it is available from the middle switch MSi, and if the middle switch MSi does not have availability for a particular destination, the middle switch MSi cannot be used to set up the connection. The embodiment of FIG. 4B can be implemented to set up connections in a controller 550 and memory 500 (described above in reference to FIG. 1A, FIG. 2A, and FIG. 2B etc.).

In rearrangeably nonblocking networks, the switch hardware cost is reduced at the expense of increasing the time required to set up a connection. The set up time is increased in a rearrangeably nonblocking network because existing connections that are disrupted to implement rearrangement need to be themselves set up, in addition to the new connection. For this reason, it is desirable to minimize or even eliminate the need for rearrangements to existing connections when setting up a new connection. When the need for rearrangement is eliminated, that network is either wide-sense nonblocking or strictly nonblocking, depending on the number of middle switches and the scheduling method. Embodiments of rearrangeably nonblocking networks using 2*n or more middle switches are described in the related U.S. patent application Ser. No. 09/967,815 that is incorporated by reference above.

In strictly nonblocking multicast networks, for any request to form a multicast connection from an inlet link to some set of outlet links, it is always possible to find a path through the network to satisfy the request without disturbing any existing multicast connections, and if more than one such path is available, any of them can be selected without being concerned about realization of future potential multicast connection requests. In wide-sense nonblocking multicast networks, it is again always possible to provide a connection path through the network to satisfy the request without disturbing other existing multicast connections, but in this case the path used to satisfy the connection request must be selected to maintain nonblocking connecting capability for future multicast connection requests. In strictly nonblocking networks and in wide-sense nonblocking networks, the switch hardware cost is increased but the time required to set up connections is reduced compared to rearrangeably nonblocking networks. Embodiments of strictly nonblocking networks using 3*n−1 or more middle switches, which use a scheduling method of time complexity O($m^2$), are described in the related U.S. patent application Ser. No. 09/967,106 that is incorporated by reference above. Embodiments of strictly nonblocking networks using $\lfloor\sqrt{r_2}\rfloor$*MIN($n_1,n_2$) when $\lfloor\sqrt{r_2}\rfloor$ is >1 and odd, or when $\lfloor\sqrt{r_2}\rfloor$=2, ($\lfloor\sqrt{r_2}\rfloor$−1)*MIN($n_1,n_2$) when $\lfloor\sqrt{r_2}\rfloor$ is >2 and even, and $n_1+n_2$−1 when $\lfloor\sqrt{r_2}\rfloor$=1, or more middle switches, which use a scheduling method of time complexity O(m), and a multicast connection is set up by fanning out not more than once in the input switch, are described in the related U.S. patent application Ser. No. 10/933,899 that is incorporated by reference above.

As discussed above, since in V(m,$n_1,r_1,n_2,r_2$) network, if an inlet link is to be connected to more than one outlet link on the same output switch, then it is only necessary for the corresponding input switch to have one path to that output switch. So the connection will be fanned out to the desired output links within the output stage switches. Hence applicant notes the multicasting problem can be solved in three different approaches:

1) Fan-out only once in the second stage and arbitrary fan-out in the first stage.
2) Fan-out only once in the first stage and arbitrary fan-out in the second stage.
3) Optimal and arbitrary fan-out in both first and second stages.

Masson and Jordan (G. M. Masson and B. W. Jordan, "Generalized Multi-stage Connection Networks", Networks, 2: pp. 191-209, 1972 by John Wiley and Sons, Inc.) presented the rearrangeably nonblocking networks and strictly nonblocking networks by following the approach 1, of fanning-out only once in the second stage and arbitrarily fanning out in the first stage. U.S. patent application Ser. No. 09/967,815 that is incorporated by reference above, and U.S. patent application Ser. No. 09/967,106 that is incorporated by reference above presented the rearrangeably nonblocking networks and strictly nonblocking networks, respectively, by following the approach 3, of fanning-out optimally and arbitrarily in both first and second stages. U.S. patent application Ser. No. 10/933,899 that is incorporated by reference above presented the strictly nonblocking networks by following the approach 2 of fanning out only once in the first stage and arbitrary fan-out in the second stage.

The foregoing discussion relates to embodiments of strictly nonblocking networks, by combining the techniques of the two approaches 2 and 3. Specifically the current invention presents V(m,$n_1,r_1,n_2,r_2$) strictly nonblocking networks, hereinafter "multi-split linear-time V(m,$n_1,r_1,n_2,r_2$) strictly nonblocking networks", by combining the methods of a) Fan-out only once in the first stage and arbitrary fan-out in the second stage, b) Optimal and arbitrary fan-out in both first and second stages. Compared to the strictly nonblocking networks of a), i.e. the networks presented in U.S. patent application Ser. No. 10/933,899 that is incorporated by reference above, the multi-split linear-time V(m,$n_1,r_1,n_2,r_2$) strictly nonblocking networks employ fewer middle stage switches m, but still use linear-time scheduling method for the strictly nonblocking operation. And compared to the strictly nonblocking networks presented in U.S. patent application Ser. No. 09/967,106 that is incorporated by reference above, the multi-split linear-time V(m,$n_1,r_1,n_2,r_2$) strictly nonblocking networks employ more number of middle stage switches m but they are faster in scheduling time.

To provide the proof for the current invention, the strictly nonblocking operation of both the symmetric networks V(m,n,r) and the asymmetric networks V(m,$n_1,r_1,n_2,r_2$) are considered. U.S. patent application Ser. No. 10/933,899 that is incorporated by reference above presented that the minimum number of middle stage switches m required for V(m,n,r) network to be operable in strictly nonblocking manner, for a few exemplary values of r as enumerated in Table 2.

TABLE 2

| r | $\lfloor\sqrt{r}\rfloor$ | m |
|---|---|---|
| 1-3 | 1 | 2 × n |
| 4-8 | 2 | |
| 9-15 | 3 | 3 × n |
| 16-24 | 4 | |
| 25-35 | 5 | 5 × n |
| 36-48 | 6 | |
| 49-63 | 7 | 7 × n |
| 64-80 | 8 | |
| 81-99 | 9 | 9 × n |
| 100-120 | 10 | |
| 121-143 | 11 | 11 × n |
| 144-168 | 12 | |
| 169-195 | 13 | 13 × n |
| 196-224 | 14 | |
| 225-255 | 15 | 15 × n |
| 256-288 | 16 | |
| 289-323 | 17 | 17 × n |
| 324-360 | 18 | |
| 361-399 | 19 | 19 × n |
| 400-440 | 20 | |
| 441-483 | 21 | 21 × n |
| 484-528 | 22 | |
| 529-575 | 23 | 23 × n |
| 576-624 | 24 | |

In Table 2 as r increases, $$\frac{m}{n}$$

also increases, and the V(m,n,r) network is operable in strictly nonblocking manner where each multicast connection is fanned out only once in the input switch using the linear scheduling method. Applicant makes a fundamental observation that by arbitrarily splitting the multicast connections in the input switch, when the fan-out of the connection is in a specified range (to be discussed next), the V(m,n,r) network is operable in strictly nonblocking manner for a smaller m than as shown in Table 2. Applicant emphasizes that arbitrary splitting of multicast connections in input switch provides the opportunity to schedule each of the constituent fan-out-spilt connections independent of other and hence scheduling method is linear in time complexity.

Figure 1C:
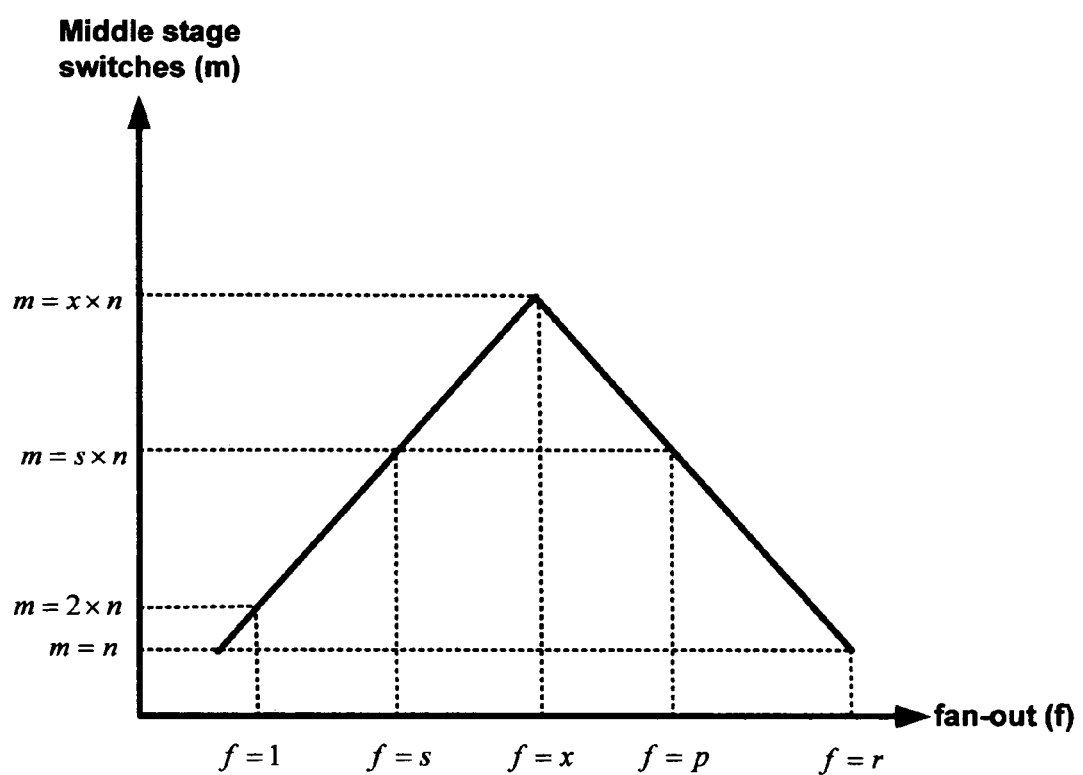
FIG. 1C is a diagram of a graph illustrating different section of ranges of fan-out of a multicast connection where it is fan-out-split differently according to the invention.

Referring to FIG. 1C, it shows the maximum number of middle switches needed for V(m,$n_1,r_1,n_2,r_2$) network to be operable in strictly nonblocking manner when a multicast connection is fanned out only once in the input switch, as presented in U.S. patent application Ser. No. 10/933,899 that is incorporated by reference above, requires a maximum of $\lfloor\sqrt{r_2}\rfloor$*MIN($n_1,n_2$) when $\lfloor\sqrt{r_2}\rfloor$ is >1 and odd, or when $\lfloor\sqrt{r_2}\rfloor$=2, ($\lfloor\sqrt{r_2}\rfloor$−1)*MIN($n_1,n_2$) when $\lfloor\sqrt{r_2}\rfloor$ is >2 and even, and $n_1+n_2$−1 when $\lfloor\sqrt{r}\rfloor$=1, middle switches (m=x in FIG. 1C). The current invention presents methods to reduce the number of middle switches by fan-out-splitting the connections only for a range of fan-outs of a multicast connection as shown in FIG. 1C; The number of middle switches is chosen as s×n for a certain values of s and p, the calculation of which is discussed next, so that the following general steps are performed:

1) When f≦s: The multicast connection is fanned out through only one middle switch.
2) When f>s and f<p: The multicast connection is arbitrarily fan-out-split s times so that each fan-out-split connection will have a fan-out of either $$\left\lceil \frac{f}{s} \right\rceil \text{ or } \left\lfloor \frac{f}{s} \right\rfloor;$$

and the connection is fanned out through not more than s middle switches.

3) When f≧p: The multicast connection is fanned out through only one middle switch.

The value of s is derived from the following two conditions:

1) $s \leq \lfloor \sqrt{r_2} \rfloor$ and p is chosen as the biggest integer and $$p = \left\lceil \frac{\lfloor \sqrt{r_2} \rfloor \times \lfloor \sqrt{r_2} \rfloor}{s} \right\rceil$$

such that $$\left\lfloor \frac{r_2 \times \lfloor \sqrt{r_2} \rfloor}{p} \right\rfloor \leq s \times \lfloor \sqrt{r_2} \rfloor.$$

2) p is further adjusted to be larger than the value computed condition 1, such that (where $$b = \left\lceil \frac{\sqrt{r_2}}{s} \right\rceil$$

and the condition 2 should be satisfied for all odd integers $\leq \lfloor \sqrt{r_2} \rfloor$)

a. $b \times \left\lceil \frac{p-1}{s} \right\rceil \times \left\lceil \frac{p-1}{s} \right\rceil \leq s \times \lfloor \sqrt{r_2} \rfloor$ when $\left\lceil \frac{p-1}{s} \right\rceil$ is odd; and b. $b \times \left(\left\lceil \frac{p-1}{s} \right\rceil + 1\right) \times \left(\left\lceil \frac{p-1}{s} \right\rceil + 1\right) \leq s \times \lfloor \sqrt{r_2} \rfloor$ when $\left\lceil \frac{p-1}{s} \right\rceil$ is even.

These conditions are applied to $V(m,n_1,r_1,n_2,r_2)$ networks to derive s for different values of $r_2$ and the proof is as follows:

1) $V(m,n_1,r_1,n_2,r_2)$ Network with $r_2 \in [9,11]$ where $\lfloor \sqrt{r_2} \rfloor = 3$:

Applicant provides the proof that this network is operable in strictly nonblocking manner when $m \geq 2 \times MIN(n_1,n_2)$:

1) When the fan-out of multicast connection is f>s and $$f < \left\lceil \frac{\lfloor \sqrt{r_2} \rfloor \times \lfloor \sqrt{r_2} \rfloor}{s} \right\rceil,$$

(i.e., f>2 and f<5), the connection is arbitrarily fan-out-split twice, and is fanned out twice in the input switch, and 2) When the fan-out of multicast connection is f≧s or $$f \geq \left\lceil \frac{\lfloor \sqrt{r_2} \rfloor \times \lfloor \sqrt{r_2} \rfloor}{s} \right\rceil,$$

(i.e., it is f≦2 or f≧5), it is fanned out only once in the input switch.

Since each multicast connection is fanned out at most twice, $m \geq 2 \times MIN(n_1,n_2)$ middle switches are necessary for strictly nonblocking operation. To prove the sufficient condition, it is recalled that $V(m,n_1,r_1,n_2,r_2)$ network operates in strictly nonblocking manner, when the multicast connections are fanned out only once in the first stage, if $m \geq \lfloor \sqrt{r_2} \rfloor \times MIN(n_1,n_2)$. The worst case m is required when the fan-out of connections is f=3. So the proof when $n_1=n_2=\lfloor \sqrt{r_2} \rfloor = 3$ is sufficient, to prove for the most general case of $n_1$ and $n_2$. The following cases are considered:

1) f≦2: It is clear that $m \geq 2 \times MIN(n_1,n_2)$ is sufficient.
2) f=3,4: Since the multicast connection is arbitrarily split into two, each of the two fan-out-spilt connections will have a fan-out of at most only 2. Hence $m \geq 2 \times MIN(n_1,n_2)$ is sufficient.
3) f≧5: There cannot be more than 6 fan-out-spilt connections of fan-out 3, and so $m \geq 2 \times MIN(n_1,n_2)$ are sufficient.

Hence the proof, and in accordance with the current invention, the three-stage network $V(m,n_1,r_1,n_2,r_2)$ is operable in strictly nonblocking manner when $m \geq 2 \times MIN(n_1,n_2)$ where $r_2 \in [9,11]$, by arbitrarily splitting multicast connections twice and fanning out twice from the input switch when the fan-out of multicast connection is f∈[3,4]; and otherwise by fanning out the connection only once in the input switch.

2) Based on this Proof the Following Two Observations are Made:

1) The $V(m,n_1,r_1,n_2,r_2)$ network is operable in strictly nonblocking manner when $m \geq 2.3 \times MIN(n_1,n_2)$ when $r_2 \in [12,13]$, by arbitrarily fan-out-splitting multicast connections twice and fanning out twice from the input switch when the fan-out of multicast connection is f∈[3,4]; and otherwise by fanning out the connection only once in the input switch.
2) The $V(m,n_1,r_1,n_2,r_2)$ network is operable in strictly nonblocking manner when $m \geq 2.6 \times MIN(n_1,n_2)$ when $r_2 \in [14]$, by arbitrarily fan-out-splitting multicast connections twice and fanning out twice from the input switch when the fan-out of multicast connection is f∈[3,4]; and otherwise by fanning out the connection only once in the input switch.

Table 3 summarizes the results for V(m,n,r) network when r∈[9-14], considered so far, to be operable in nonblocking manner according to the current invention.

TABLE 3

| r | n | S | m | Minimum fan-out for fan-out-splitting | Maximum fan-out for fan-out-splitting (p − 1) | Middle switches used in worst case scenario |
|---|---|---|---|---|---|---|
| 9-11 | 3 | 2 | 6 | 3 | 4 | 11 * 3/5 = 6 |
| 12-13 | 3 | 2.3 | 7 | 3 | 4 | 13 * 3/5 = 7 |
| 14 | 3 | 2.6 | 8 | 3 | 4 | 14 * 3/5 = 8 |

3) $V(m,n_1,r_1,n_2,r_2)$ Network with $r_2 \in [15,24]$ where $\lfloor \sqrt{r_2} \rfloor \in [3,4]$:

Applicant notes that when $r_2 \in [15]$, by arbitrarily fan-out-splitting multicast connections twice and fanning out twice from the input switch when the fan-out of multicast connection is $f \in [3,4]$; and otherwise by fanning out the connection only once in the input switch with $m \geq 2 \times MIN(n_1, n_2)$ does not make $V(m,n_1,r_1,n_2,r_2)$ operable in strictly nonblocking manner because $$\left\lceil \frac{r_2 \times \lfloor \sqrt{r_2} \rfloor}{p} \right\rceil \leq s \times \lfloor \sqrt{r_2} \rfloor$$

is not satisfied where $$p = \left\lceil \frac{\lfloor \sqrt{r_2} \rfloor \times \lfloor \sqrt{r_2} \rfloor}{s} \right\rceil.$$

And so $m \geq 3 \times MIN(n_1, n_2)$ is required for this network to be operable in strictly nonblocking manner. However from Table 2, it is easily observed that when $r_2 \in [15,24]$, $V(m,n_1,r_1,n_2,r_2)$ network is operable in strictly nonblocking manner when $m \geq 3 \times MIN(n_1, n_2)$; and splitting the multicast connections does not reduce the number of required middle switches. It is the same case when $r_2 \in [16,24]$.

The proofs given so far can be extended to the following $V(m,n_1,r_1,n_2,r_2)$ networks as well:

4) $V(m,n_1,r_1,n_2,r_2)$ Network with $r_2 \in [25,35]$ where $\lfloor \sqrt{r_2} \rfloor = 5$:

The multicast connections with fan-out $f \in [5,12]$ are arbitrarily fan-out-split into three so that all three fan-out-spilt connections have fan-out of either $$\left\lfloor \frac{f}{3} \right\rfloor \text{ or } \left\lceil \frac{f}{3} \right\rceil$$

and otherwise the multicast connection is fanned out only once in the input switch. Then the three-stage network $V(m, n_1,r_1,n_2,r_2)$ is operable in strictly nonblocking manner when $m \geq 3 \times MIN(n_1, n_2)$.

5) $V(m,n_1,r_1,n_2,r_2)$ Network with $r_2 \in [36,48]$ where $\lfloor \sqrt{r_2} \rfloor = 6$:

The multicast connections with fan-out $f \in [5,16]$ are arbitrarily fan-out-split into three so that all three fan-out-spilt connections have fan-out of either $$\left\lfloor \frac{f}{3} \right\rfloor \text{ or } \left\lceil \frac{f}{3} \right\rceil$$

and otherwise the multicast connection is fanned out only once in the input switch. Then the three-stage network $V(m, n_1,r_1,n_2,r_2)$ is operable in strictly nonblocking manner when $m \geq 3 \times MIN(n_1, n_2)$.

Applicant notes that when $r_2 \in [49]$, by arbitrarily fan-out-splitting multicast connections three times and fanning out three times from the input switch when the fan-out of multicast connection is $f \in [5,18]$; and otherwise by fanning out the connection only once in the input switch with $m \geq 3 \times MIN(n_1, n_2)$ does not make $V(m,n_1,r_1,n_2,r_2)$ operable in strictly nonblocking manner because $$\left\lceil \frac{r_2 \times \lfloor \sqrt{r_2} \rfloor}{p} \right\rceil \leq s \times \lfloor \sqrt{r_2} \rfloor$$

is not satisfied where $$p = \left\lceil \frac{\lfloor \sqrt{r_2} \rfloor \times \lfloor \sqrt{r_2} \rfloor}{s} \right\rceil.$$

And so $m \geq 4 \times MIN(n_1, n_2)$ is required for this network to be operable in strictly nonblocking manner.

Table 4 summarizes the results for $V(m,n,r)$ network when $r \in [25,48]$, considered so far, to be operable in nonblocking manner according to the current invention.

TABLE 4

| R | n | s | m | Minimum fan-out for splitting | Maximum fan-out for fan-out-splitting (p − 1) | Middle switches used in worst case scenario |
|---|---|---|---|---|---|---|
| 25-35 | 5 | 3 | 15 | 5 | 12 | 35 * 5/13 = 13 |
| 36-48 | 6 | 3 | 18 | 5 | 16 | 48 * 6/17 = 16 |

6) $V(m,n_1,r_1,n_2,r_2)$ Network with $r_2 \in [49,63]$ where $\lfloor r_2 \rfloor = 7$:

The multicast connections with fan-out $f \in [5,24]$ are arbitrarily fan-out-split into four so that all four fan-out-spilt connections have fan-out of either $$\left\lfloor \frac{f}{4} \right\rfloor \text{ or } \left\lceil \frac{f}{4} \right\rceil$$

and otherwise the multicast connection is fanned out only once in the input switch. Then the three-stage network $V(m, n_1,r_1,n_2,r_2)$ is operable in strictly nonblocking manner when $m \geq 4 \times MIN(n_1, n_2)$.

7) $V(m,n_1,r_1,n_2,r_2)$ Network with $r_2 \in [64,80]$ where $\lfloor \sqrt{r_2} \rfloor = 8$:

The multicast connections with fan-out $f \in [5,24]$ are arbitrarily fan-out-split into four so that all four fan-out-spilt connections have fan-out of either $$\left\lfloor \frac{f}{4} \right\rfloor \text{ or } \left\lceil \frac{f}{4} \right\rceil$$

and otherwise the multicast connection is fanned out only once in the input switch. Then the three-stage network V(m, $n_1,r_1,n_2,r_2$) is operable in strictly nonblocking manner when m≧4×MIN($n_1,n_2$).

8) V(m,$n_1,r_1,n_2,r_2$) Network with $r_2 \in [81,99]$ where $\lfloor \sqrt{r_2} \rfloor = 9$:

The multicast connections with fan-out f∈[5,20] are arbitrarily fan-out-split into four so that all four fan-out-spilt connections have fan-out of either $$\left\lfloor \frac{f}{4} \right\rfloor \text{ or } \left\lceil \frac{f}{4} \right\rceil$$

and otherwise the multicast connection is fanned out only once in the input switch. Then the three-stage network V(m, $n_1,r_1,n_2,r_2$) is operable in strictly nonblocking manner when m≧4×MIN($n_1,n_2$).

Applicant notes that when $r_2 \in [100]$, by arbitrarily fan-out-splitting multicast connections four times and fanning out four times from the input switch when the fan-out of multicast connection is f∈[5,25]; and otherwise by fanning out the connection only once in the input switch with m≧4×MIN($n_1,n_2$) does not make V(m,$n_1,r_1,n_2,r_2$) operable in strictly nonblocking manner because $$2 * \left\lceil \frac{p-1}{s} \right\rceil \times \left\lceil \frac{p-1}{s} \right\rceil \leq s \times \lfloor \sqrt{r_2} \rfloor$$

is not satisfied i.e., $$2 * \left\lceil \frac{24}{5} \right\rceil \times \left\lceil \frac{24}{5} \right\rceil > 4 \times 10.$$

And so m≧5×MIN($n_1,n_2$) is required for this network to be operable in strictly nonblocking manner.

Table 5 summarizes the results for V(m,n,r) network when r∈[49-99], considered so far, to be operable in nonblocking manner according to the current invention.

TABLE 5

| R | n | s | m | Minimum fan-out for splitting | Maximum fan-out for fan-out-splitting (p − 1) | Middle switches used in worst case scenario |
|---|---|---|---|---|---|---|
| 49-63 | 7 | 4 | 28 | 5 | 16 | 63 * 7/17 = 25 |
| 64-80 | 8 | 4 | 32 | 5 | 24 | 80 * 8/25 = 25 |
| 81-99 | 9 | 4 | 36 | 5 | 24 | 99 * 9/25 = 35 |

9) V(m,$n_1,r_1,n_2,r_2$) Network with $r_2 \in [100,120]$ where $\lfloor \sqrt{r_2} \rfloor = 10$:

The multicast connections with fan-out f∈[7,31] are arbitrarily fan-out-split into five so that all five fan-out-spilt connections have fan-out of either $$\left\lfloor \frac{f}{5} \right\rfloor \text{ or } \left\lceil \frac{f}{5} \right\rceil$$

and otherwise the multicast connection is fanned out only once in the input switch. Then the three-stage network V(m, $n_1,r_1,n_2,r_2$) is operable in strictly nonblocking manner when m≧5×MIN($n_1,n_2$).

10) V(m,$n_1,r_1,n_2,r_2$) Network with $r_2 \in [121,143]$ where $\lfloor \sqrt{r_2} \rfloor = 11$:

The multicast connections with fan-out f∈[7,30] are arbitrarily fan-out-split into five so that all five fan-out-spilt connections have fan-out of either $$\left\lfloor \frac{f}{5} \right\rfloor \text{ or } \left\lceil \frac{f}{5} \right\rceil$$

and otherwise the multicast connection is fanned out only once in the input switch. Then the three-stage network V(m, $n_1,r_1,n_2,r_2$) is operable in strictly nonblocking manner when m≧5×MIN($n_1,n_2$).

11) V(m,$n_1,r_1,n_2,r_2$) Network with $r_2 \in [144,154]$ where $\lfloor \sqrt{r_2} \rfloor = 12$:

The multicast connections with fan-out f∈[7,30] are arbitrarily fan-out-split into five so that all five fan-out-spilt connections have fan-out of either $$\left\lfloor \frac{f}{5} \right\rfloor \text{ or } \left\lceil \frac{f}{5} \right\rceil$$

and otherwise the multicast connection is fanned out only once in the input switch. Then the three-stage network V(m, $n_1,r_1,n_2,r_2$) is operable in strictly nonblocking manner when m≧5×MIN($n_1,n_2$).

Applicant notes that when $r_2 \in [155]$, by arbitrarily fan-out-splitting multicast connections five times and fanning out five times from the input switch when the fan-out of multicast connection is f∈[7,31]; and otherwise by fanning out the connection only once in the input switch with m≧5×MIN($n_1,n_2$) does not make V(m,$n_1,r_1,n_2,r_2$) operable in strictly nonblocking manner because $$2 * \left\lceil \frac{p-1}{s} \right\rceil \times \left\lceil \frac{p-1}{s} \right\rceil \leq s \times \lfloor \sqrt{r_2} \rfloor$$

is not satisfied i.e., $$\left\lceil \frac{31}{3} \right\rceil \times \left\lceil \frac{31}{3} \right\rceil > 5 \times 12.$$

And so m≧6×MIN($n_1,n_2$) is required for this network to be operable in strictly nonblocking manner.

Table 7 summarizes the results for V(m,n,r) network when r∈[100-154], considered so far, to be operable in nonblocking manner according to the current invention.

TABLE 6

| R | n | s | m | Minimum fan-out for splitting | Maximum fan-out for fan-out- splitting (p − 1) | Middle switches used in worst case scenario |
|---|---|---|---|---|---|---|
| 100-120 | 10 | 5 | 50 | 7 | 30 | 120 * 10/31 = 38 |
| 121-143 | 11 | 5 | 55 | 7 | 30 | 143 * 11/31 = 50 |
| 144-154 | 12 | 5 | 60 | 7 | 30 | 154 * 12/31 = 60 |

12) $V(m,n_1,r_1,n_2,r_2)$ Network with $r_2 \epsilon [155,168]$ where $\lfloor \sqrt{r_2} \rfloor = 12$:

The multicast connections with fan-out $f \epsilon [7,36]$ are arbitrarily fan-out-split into six so that all six fan-out-spilt connections have fan-out of either $$\left\lfloor \frac{f}{6} \right\rfloor \text{ or } \left\lceil \frac{f}{6} \right\rceil$$

and otherwise the multicast connection is fanned out only once in the input switch. Then the three-stage network $V(m, n_1,r_1,n_2,r_2)$ is operable in strictly nonblocking manner when $m \geq 6 \times MIN(n_1,n_2)$.

13) $V(m,n_1,r_1,n_2,r_2)$ Network with $r_2 \epsilon [169,195]$ where $\lfloor \sqrt{r_2} \rfloor = 13$:

The multicast connections with fan-out $f \epsilon [7,36]$ are arbitrarily fan-out-split into six so that all six fan-out-spilt connections have fan-out of either $$\left\lfloor \frac{f}{6} \right\rfloor \text{ or } \left\lceil \frac{f}{6} \right\rceil$$

and otherwise the multicast connection is fanned out only once in the input switch. Then the three-stage network $V(m, n_1,r_1,n_2,r_2)$ is operable in strictly nonblocking manner when $m \geq 6 \times M17V(n_1,n_2)$.

14) $V(m,n_1,r_1,n_2,r_2)$ Network with $r_2 \epsilon [196,224]$ where $\lfloor \sqrt{r_2} \rfloor = 14$:

The multicast connections with fan-out $f \epsilon [7,36]$ are arbitrarily fan-out-split into six so that all six fan-out-spilt connections have fan-out of either $$\left\lfloor \frac{f}{6} \right\rfloor \text{ or } \left\lceil \frac{f}{6} \right\rceil$$

and otherwise the multicast connection is fanned out only once in the input switch. Then the three-stage network $V(m, n_1,r_1,n_2,r_2)$ is operable in strictly nonblocking manner when $m \geq 6 \times MIN(n_1,n_2)$.

Applicant notes that when $r_2 \epsilon [225]$, by arbitrarily fan-out-splitting multicast connections five times and fanning out five times from the input switch when the fan-out of multicast connection is $f \epsilon [7,32]$; and otherwise by fanning out the connection only once in the input switch with $m \geq 6 \times MIN(n_1,n_2)$ does not make $V(m,n_1,r_1,n_2,r_2)$ operable in strictly nonblocking manner because $$\left\lceil \frac{p}{s} \right\rceil \times \left\lceil \frac{p}{s} \right\rceil \leq s \times \lfloor \sqrt{r_2} \rfloor$$

is not satisfied i.e., $$\left\lceil \frac{32}{3} \right\rceil \times \left\lceil \frac{32}{3} \right\rceil > 6 \times 15.$$

And so $m \geq 7 \times MIN(n_1,n_2)$ is required for this network to be operable in strictly nonblocking manner.

Table 7 summarizes the results for $V(m,n,r)$ network when $r \epsilon [155-224]$, considered so far, to be operable in nonblocking manner according to the current invention.

TABLE 7

| R | n | s | m | Minimum fan-out for splitting | Maximum fan-out for fan-out- splitting (p − 1) | Middle switches used in worst case scenario |
|---|---|---|---|---|---|---|
| 155-168 | 12 | 6 | 72 | 7 | 36 | 168 * 12/37 = 54 |
| 169-195 | 13 | 6 | 78 | 7 | 36 | 195 * 13/37 = 68 |
| 196-224 | 14 | 6 | 84 | 7 | 36 | 224 * 14/37 = 84 |

15) $V(m,n_1,r_1,n_2,r_2)$ Network with $r_2 \epsilon [225,255]$ where $\lfloor \sqrt{r_2} \rfloor = 15$:

The multicast connections with fan-out $f \epsilon [9,56]$ are arbitrarily fan-out-split into seven so that all seven fan-out-spilt connections have fan-out of either $$\left\lfloor \frac{f}{7} \right\rfloor \text{ or } \left\lceil \frac{f}{7} \right\rceil$$

and otherwise the multicast connection is fanned out only once in the input switch. Then the three-stage network $V(m, n_1,r_1,n_2,r_2)$ is operable in strictly nonblocking manner when $m \geq 7 \times MIN(n_1,n_2)$.

16) $V(m,n_1,r_1,n_2,r_2)$ Network with $r_2 \epsilon [256,278]$ where $\lfloor \sqrt{r_2} \rfloor = 16$:

The multicast connections with fan-out $f \epsilon [9,56]$ are arbitrarily fan-out-split into seven so that all seven fan-out-spilt connections have fan-out of either $$\left\lfloor \frac{f}{7} \right\rfloor \text{ or } \left\lceil \frac{f}{7} \right\rceil$$

and otherwise the multicast connection is fanned out only once in the input switch. Then the three-stage network $V(m, n_1,r_1,n_2,r_2)$ is operable in strictly nonblocking manner when $m \geq 7 \times MIN(n_1,n_2)$.

Table 8 summarizes the results for $V(m,n,r)$ network when $r \epsilon [225-278]$, considered so far, to be operable in nonblocking manner according to the current invention.

TABLE 8

| R | n | s | m | Minimum fan-out for splitting | Maximum fan-out for fan-out-splitting (p – 1) | Middle switches used in worst case scenario |
|---|---|---|---|---|---|---|
| 225-255 | 15 | 7 | 105 | 9 | 56 | 255 * 15/57 = 67 |
| 256-278 | 16 | 7 | 112 | 9 | 56 | 278 * 16/57 = 78 |

Figure 5A:
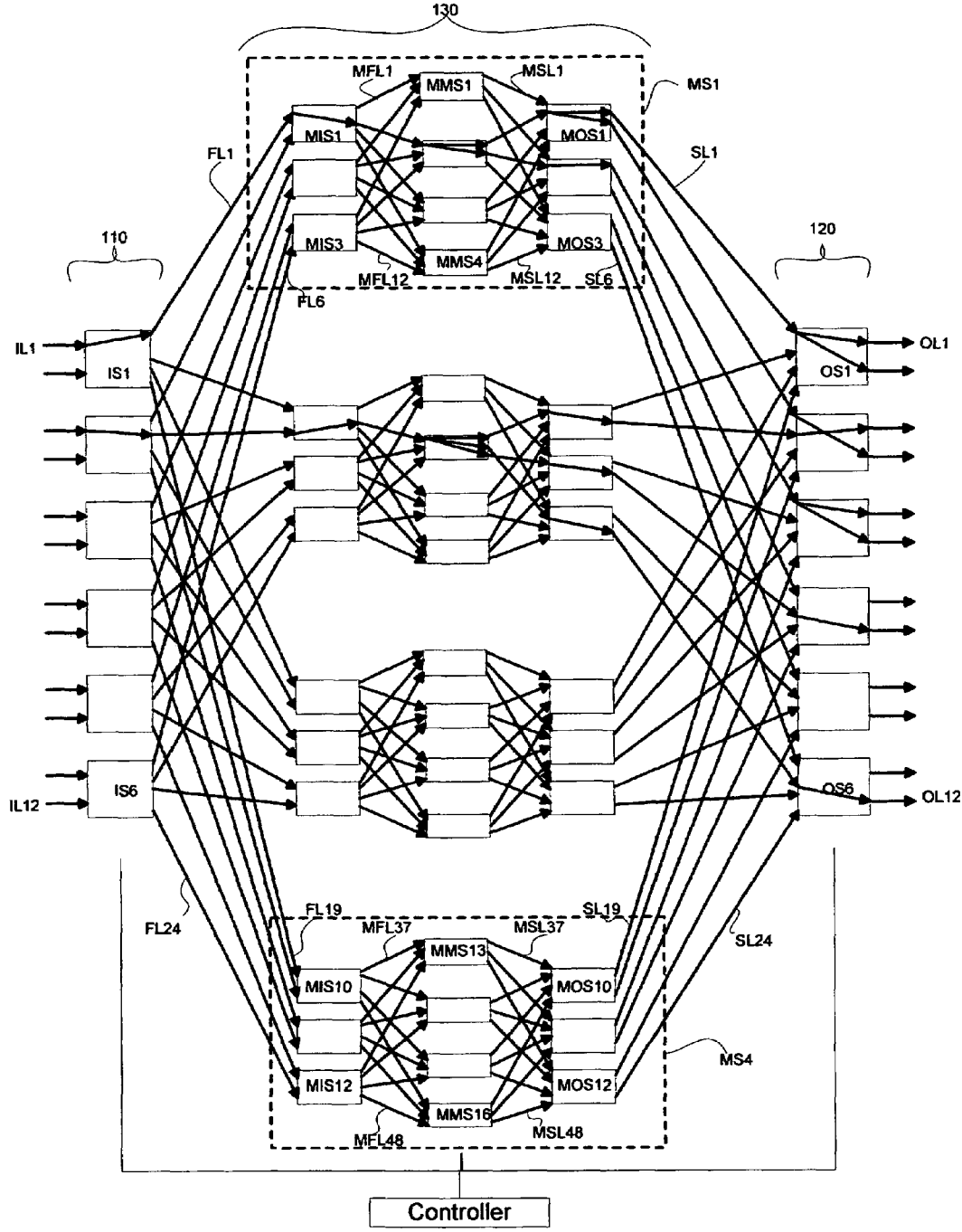
FIG. 5A is a diagram of an exemplary three-stage network where the middle stage switches are each three-stage networks.

Referring to FIG. 5A a five stage strictly nonblocking network is shown according to an embodiment of the present invention that uses recursion as follows. The five stage network comprises input stage 110 and output stage 120, with inlet links IL1-IL12 and outlet links OL1-OL12 respectively, where input stage 110 consist of six, two by four switches IS1-IS6, and output stage 120 consist of six, four by two switches OS1-OS6. However, unlike the single switches of middle stage 130 of the three-stage network of FIG. 1A, the middle stage 130 of FIG. 5A consists of four, six by six three-stage subnetworks MS1-MS4 (wherein the term "subnetwork" has the same meaning as the term "network"). Each of the four middle switches MS1-MS4 are connected to each of the input switches through six first internal links (for example the links FL1-FL6 connected to the middle switch MS1 from each of the input switch IS1-IS6), and connected to each of the output switches through six second internal links (for example the links SL1-SL6 connected from the middle switch MS1 to each of the output switch OS1-OS6). In one embodiment, the network also includes a controller coupled with the input stage 110, output stage 120 and middle stage subnetworks 130 to form connections between inlet links IL1-IL12 and an arbitrary number of outlet links OL1-OL12.

Each of middle switches MS1-MS4 is a V(4,2,3) three-stage subnetwork. For example, the three-stage subnetwork MS1 comprises input stage of three, two by four switches MIS1-MIS3 with inlet links FL1-FL6, and an output stage of three, four by two switches MOS1-MOS3 with outlet links SL1-SL6. The middle stage of MS1 consists of four, three by three switches MMS1-MMS4. Each of the middle switches MMS1-MMS4 are connected to each of the input switches MIS1-MIS3 through three first internal links (for example the links MFL1-MFL3 connected to the middle switch MMS1 from each of the input switch MIS1-MIS3), and connected to each of the output switches MOS1-MOS3 through three second internal links (for example the links MSL1-MSL3 connected from the middle switch MMS1 to each of the output switch MOS1-MOS3). In similar fashion the number of stages can increase to 7, 9, etc.

According to the present invention, the three-stage network of FIG. 5A requires no more than m>s*n where s=2 when r=[9,11],
s=3 when r=[25,48],
s=4 when r=[49,99],
s=5 when r=[100,154],
s=6 when r=[155,224], and
s=7 when r=[225,278].

middle stage three-stage subnetworks to be operable in strictly nonblocking manner. Thus in FIG. 5A where n equals 2 and r equals 6, middle stage 130 has s×n equals four middle stage three-stage networks MS1-MS4. Furthermore, according to the present invention, each of the middle stage networks MS1-MS4, in turn, are three-stage networks and require no more than m≧s*n where s=2 when q=[9,11],
s=3 when q=[25,48],
s=4 when q=[49,99],
s=5 when q=,[100,154],
s=6 when q=[155,224], and
s=7 when q=[225,278].

middle switches MMS1-MMS4, where p is the number of inlet links for each middle input switch MIS1-MIS3 with q being the number of switches in the input stage (equals to 3 in FIG. 5A) and p is the number of outlet links for each middle output switch MOS1-MOS3 with q being the number of switches in the output stage (equals to 3 in FIG. 5A).

In general, according to certain embodiments, one or more of the switches, in any of the first, middle and last stages can be recursively replaced by a three-stage subnetwork with no more than m≧s*MIN($n_1,n_2$) where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278].

middle stage switches where $n_1$ is the number of inlet links to the first stage switch in the subnetwork with $r_1$ being the number of switches in the first stage of the subnetwork and $n_2$ is the number of outlet links to the last stage switch of the subnetwork with $r_2$ being the number of switches in the last stage of the subnetwork, for strictly nonblocking operation for multicast connections of arbitrary fan-out. Note that because the term "subnetwork" has the same meaning as "network", the just described replacement can be repeated recursively, as often as desired, depending on the embodiment. Also each subnetwork may have a separate controller and memory to schedule the multicast connections of corresponding network.

It should be understood that the methods, discussed so far, are applicable to k-stage networks for k>3 by recursively using the design criteria developed on any of the switches in the network. The presentation of the methods in terms of three-stage networks is only for notational convenience. That is, these methods can be generalized by recursively replacing each of a subset of switches (at least 1) in the network with a smaller three-stage network, which has the same number of total inlet links and total outlet links as the switch being replaced. For instance, in a three-stage network, one or more switches in either the input, middle or output stages can be replaced with a three-stage network to expand the network. If, for example, a five-stage network is desired, then all middle switches (or all input switches or all output switches) are replaced with a three-stage network In accordance with the invention, in any of the recursive three-stage networks each connection can fan out in the first stage switch into only one middle stage subnetwork, and in the middle switches and last stage switches it can fan out any arbitrary number of times as required by the connection request. For example as shown in the network of FIG. 5A, connection $I_1$ fans out in the first stage switch IS1 once into middle stage subnetwork MS1. In middle stage subnetwork MS1 it fans out three times into output switches OS1, OS2, and OS3. In output switches OS1 and OS3 it fans out twice. Specifically in output switch OS1 into outlet links OL1, OL2, and in output switch OS3 into outlet links OL5, OL6. In output switch OS2 it fans out once into outlet link OS4. However in the three-stage network MS1, it can fan out only once in the first stage, for example connection $I_1$ fans out once in the input switch MIS1 into middle switch MMS2 of the three-stage subnetwork MS1. Similarly a connection can fan out arbitrary number of times in the middle and last stages of any three-stage subnetwork. For example connection $I_1$ fans out twice in middle switch MMS2 into output switches MOS1 and MOS2 of three-stage subnetwork MS1. In the output switch MOS1 of three-stage subnetwork MS1 it fans out twice into output switches OS1 and OS2. And in the output switch MOS2 of three-stage subnetwork MS1 it fans out once into output switch OS3.

The connection $I_3$ fans out once into three-stage subnetwork MS2 where it is fanned out three times into output switches OS2, OS4, and OS6. In output switches OS2, OS4, and OS6 it fans out once into outlet links OL3, OL8, and OL12 respectively. The connection 13 fans out once in the input switch MIS4 of three-stage subnetwork MS2 into middle switch MMS6 of three-stage subnetwork MS2 where it fans out three times into output switches MOS4, MOS5, and MOS6 of the three-stage subnetwork MS2. In each of the three output switches MOS4, MOS5 and MOS6 of the three-stage subnetwork MS2 it fans out once into output switches OS2, OS4, and OS6 respectively.

Figure 5B:
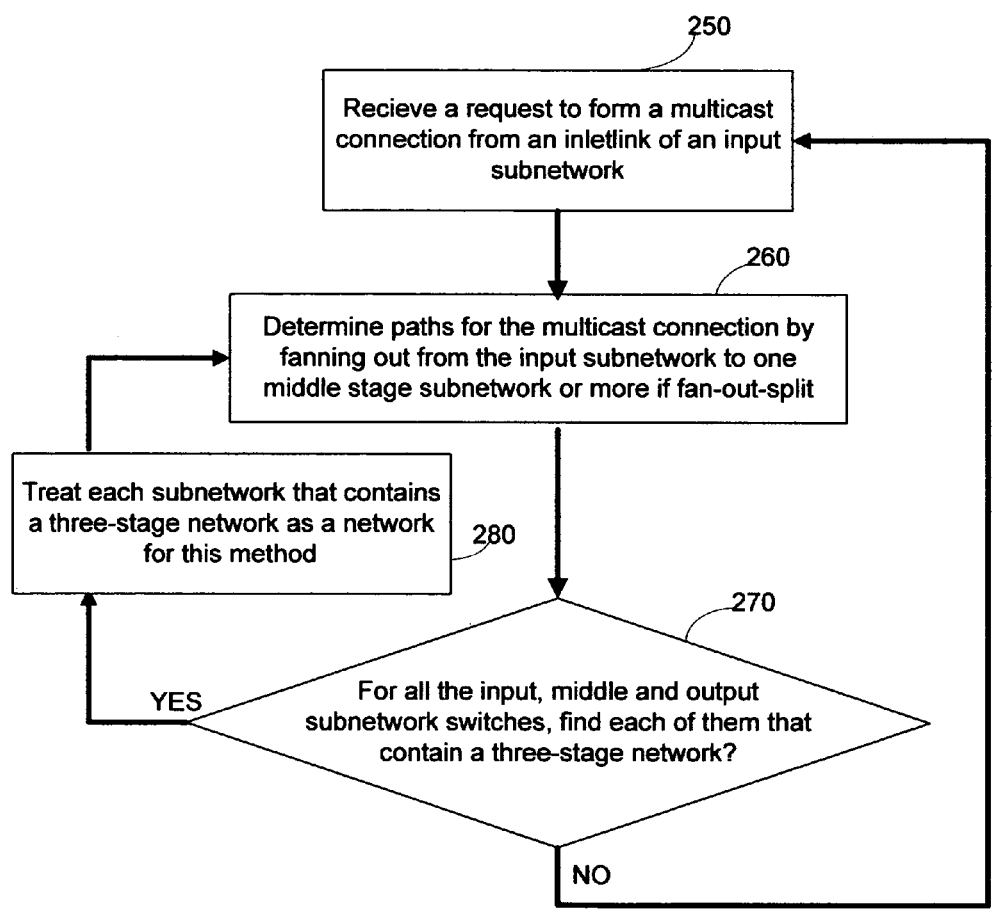
FIG. 5B is high-level flowchart, in one embodiment, of a recursively scheduling method in a recursively large multi-stage network such as the network in FIG. 5A.

FIG. 5B shows a high-level flowchart of a strictly scheduling method, in one embodiment executed by the controller of FIG. 5A. The method of FIG. 5B is used only for networks that have three stages each of which may be in turn composed of three-stage subnetworks, in a recursive manner as described above in reference to FIG. 5A. According to this embodiment, a multicast connection request is received in act 250 (FIG. 5B). Then a connection to satisfy the request is set up in act 260 by fanning out, one or more times when fan-out-split, into middle stage subnetwork from its input switch. Then, in one embodiment, the control goes to act 270. Act 270 recursively goes through each subnetwork contained in the network. For each subnetwork found in act 270 the control goes to act 280 and each subnetwork is treated as a network and the scheduling is performed similarly. Once all the recursive subnetworks are scheduled the control transfers from act 270 to act 250 so that each multicast connection will be scheduled in the same manner in a loop.

A $V(m,n_1,r_1,n_2,r_2)$ network can be further generalized, in an embodiment, by having an input stage comprising $r_1$ input switches and $n_{1w}$ inlet links in input switch w, for each of said $r_1$ input switches such that $w \in [1,r_1]$ and $n_1 = MAX(n_{1w})$; an output stage comprising $r_2$ output switches and $n_{2v}$ outlet links in output switch v, for each of said $r_2$ output switches such that $v \in [1,r_2]$ and $n_2 = MAX(n_{2v})$; and a middle stage comprising m middle switches, and each middle switch comprising at least one link connected to each input switch for a total of at least $r_1$ first internal links; each middle switch further comprising at least one link connected to at most d said output switches for a total of at least d second internal links, wherein $1 \leq d \leq r_2$, and applicant notes that such an embodiment can be operated in strictly nonblocking manner, according to the current invention, for multicast connections by fanning out only once in the input switch if $m \geq s*MIN(n_1, n_2)$ where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278].

The $V(m,n_1,r_1,n_2,r_2)$ network embodiments described so far, in the current invention, are implemented in space-space-space, also known as SSS configuration. In this configuration all the input switches, output switches and middle switches are implemented as separate switches, for example in one embodiment as crossbar switches. The three-stage networks $V(m,n_1,r_1,n_2,r_2)$ can also be implemented in a time-space-time, also known as TST configuration. In TST configuration, in the first stage and the last stage all the input switches and all the output switches are implemented as separate switches. However the middle stage, in accordance with the current invention, uses s number of switches if $m \geq s*MIN(n_1,n_2)$ where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278], with each middle switch having $r_1$ first internal links connected to all input switches and also having $r_2$ second internal links connected to all output switches. The TST configuration implements the switching mechanism, in accordance with the current invention, in $MIN(n_1,n_2)$ steps in a circular fashion. So in TST configuration, the middle stage physically implements only s middle switches; and they are shared in time in, $MIN(n_1,n_2)$ steps, to switch packets or timeslots from input ports to the output ports.

The three-stage networks $V(m,n_1,r_1,n_2,r_2)$ implemented in TST configuration play a key role in communication switching systems. In one embodiment a crossconnect in a TDM based switching system such as SONET/SDH system, each communication link is time-division multiplexed—as an example an OC-12 SONET link consists of 336 VT1.5 channels time-division multiplexed. In another embodiment a switch fabric in packet based switching system switching such as IP packets, each communication link is statistically time division multiplexed. When a $V(m,n_1,r_1,n_2,r_2)$ network is switching TDM or packet based links, each of the $r_1$ input switches receive time division multiplexed signals—for example if each input switch is receiving an OC-12 SONET stream and if the switching granularity is VT1.5 then $n_1$ (=336) inlet links with each inlet link receiving a different VT1.5 channel in a OC-12 frame. A crossconnect, using a $V(m,n_1,r_1,n_2,r_2)$ network, to switch implements a TST configuration, so that switching is also performed in time division multiplexed fashion just the same way communication in the links is performed in time division multiplexed fashion.

Figure 6A:
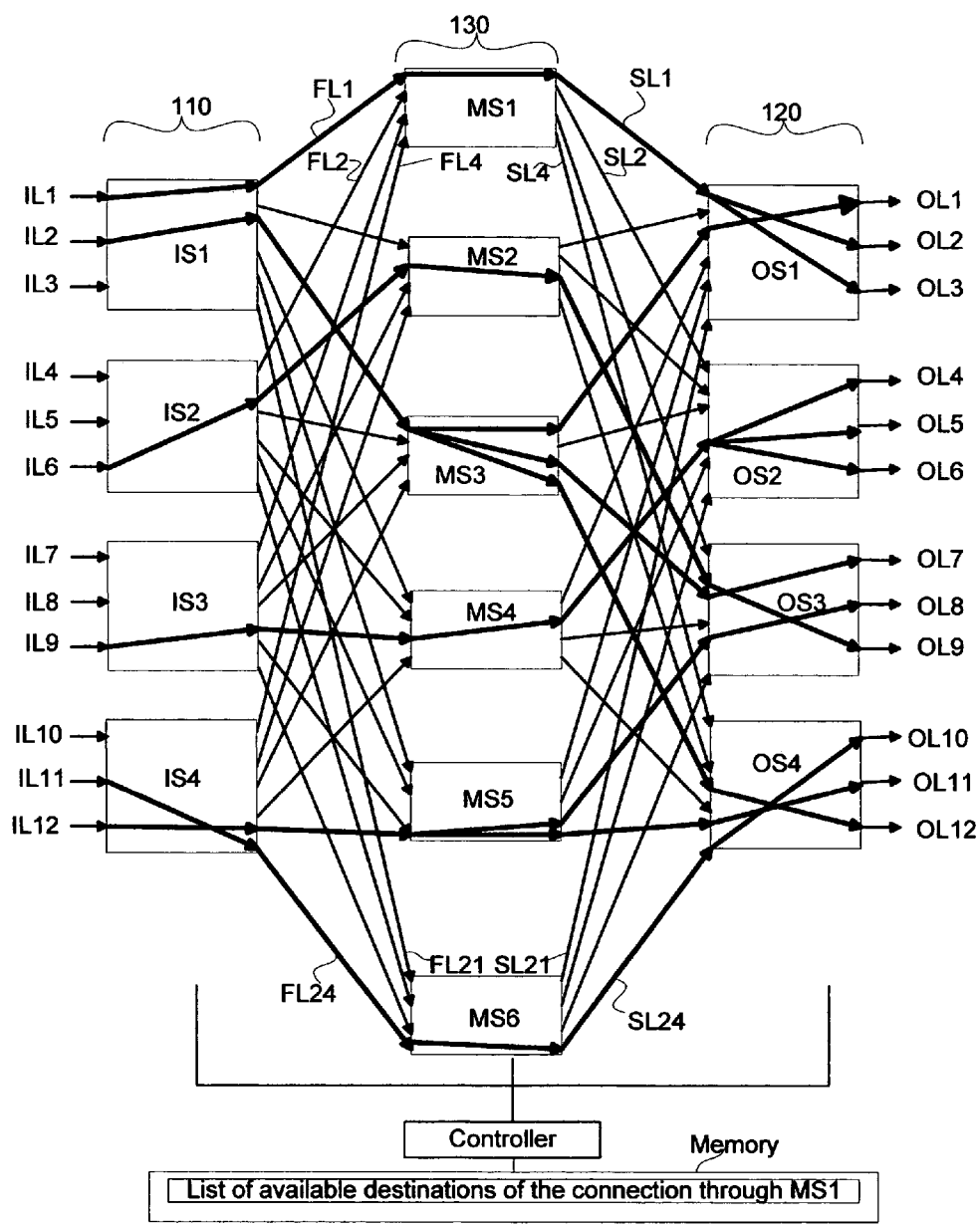
FIG. 6A is a diagram of an exemplary V(6,3,4) three-stage network, with m=s*n middle stage switches, where s=2, implemented in space-space-space configuration, with certain existing multicast connections setup using the method 140 of FIG. 1B.

For example, the network of FIG. 6A shows an exemplary three-stage network, namely $V(6,3,4)$ in space-space-space configuration, with the following multicast assignment $I_1=\{1\}$, $I_2=\{1,3,4\}$, $I_6=\{3\}$, $I_9=\{2\}$, $I_{11}=\{4\}$ and $I_{12}=\{3,4\}$. According to the current invention, the multicast assignment is setup by fanning out each connection not more than once in the first stage. The connection $I_1$ fans out in the first stage switch IS1 into the middle stage switch MS1, and fans out in middle switch MS1 into output switch OS1. The connection $I_1$ also fans out in the last stage switch OS1 into the outlet links OL2 and OL3. The connection $I_2$ fans out in the first stage switch IS1 into the middle stage switch MS3, and fans out in middle switch MS3 into output switches OS1, OS3, and OS4. The connection $I_2$ also fans out in the last stage switches OS1, OS3, and OS4 into the outlet links OL1, OL7 and OL12 respectively. The connection $I_6$ fans out once in the input switch IS2 into middle switch MS2 and fans out in the middle stage switch MS2 into the last stage switch OS3. The connection $I_6$ fans out once in the output switch OS3 into outlet link OL9.

The connection $I_9$ fans out once in the input switch IS3 into middle switch MS4, fans out in the middle switch MS4 once into output switch OS2. The connection $I_9$ fans out in the output switch OS2 into outlet links OL4, OL5, and OL6. The connection $I_{11}$ fans out once in the input switch IS4 into middle switch MS6, fans out in the middle switch MS6 once into output switch OS4. The connection $I_{11}$ fans out in the output switch OS4 into outlet link OL10. The connection $I_{12}$ fans out once in the input switch IS4 into middle switch MS5, fans out in the middle switch MS5 twice into output switches OS3 and OS4. The connection $I_{12}$ fans out in the output switch OS3 and OS4 into outlet links OL8 and OL11 respectively.

Figure 6B:
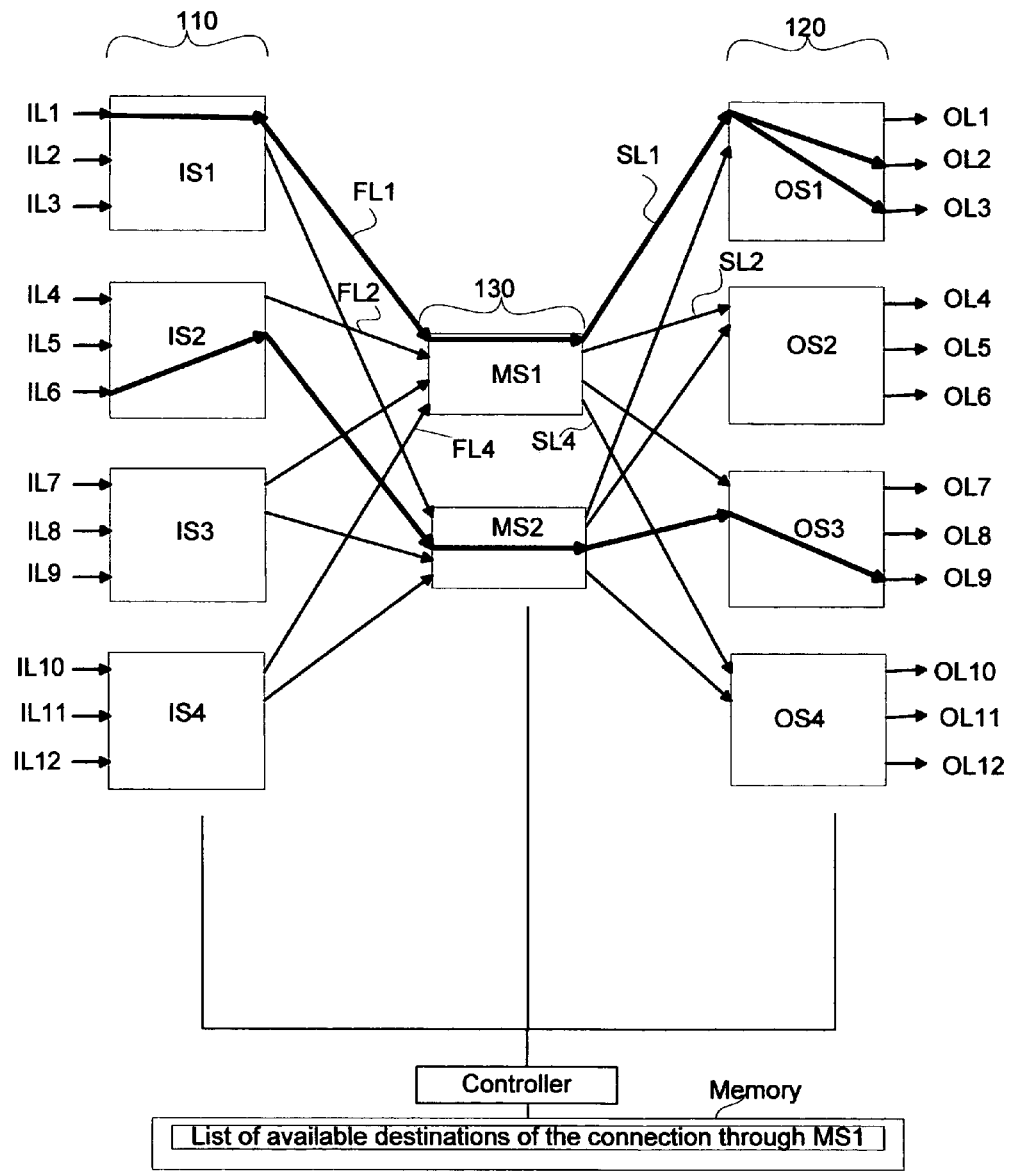
FIG. 6B is the first time step of the TST implementation of the network in FIG. 6A.
Figure 6C:
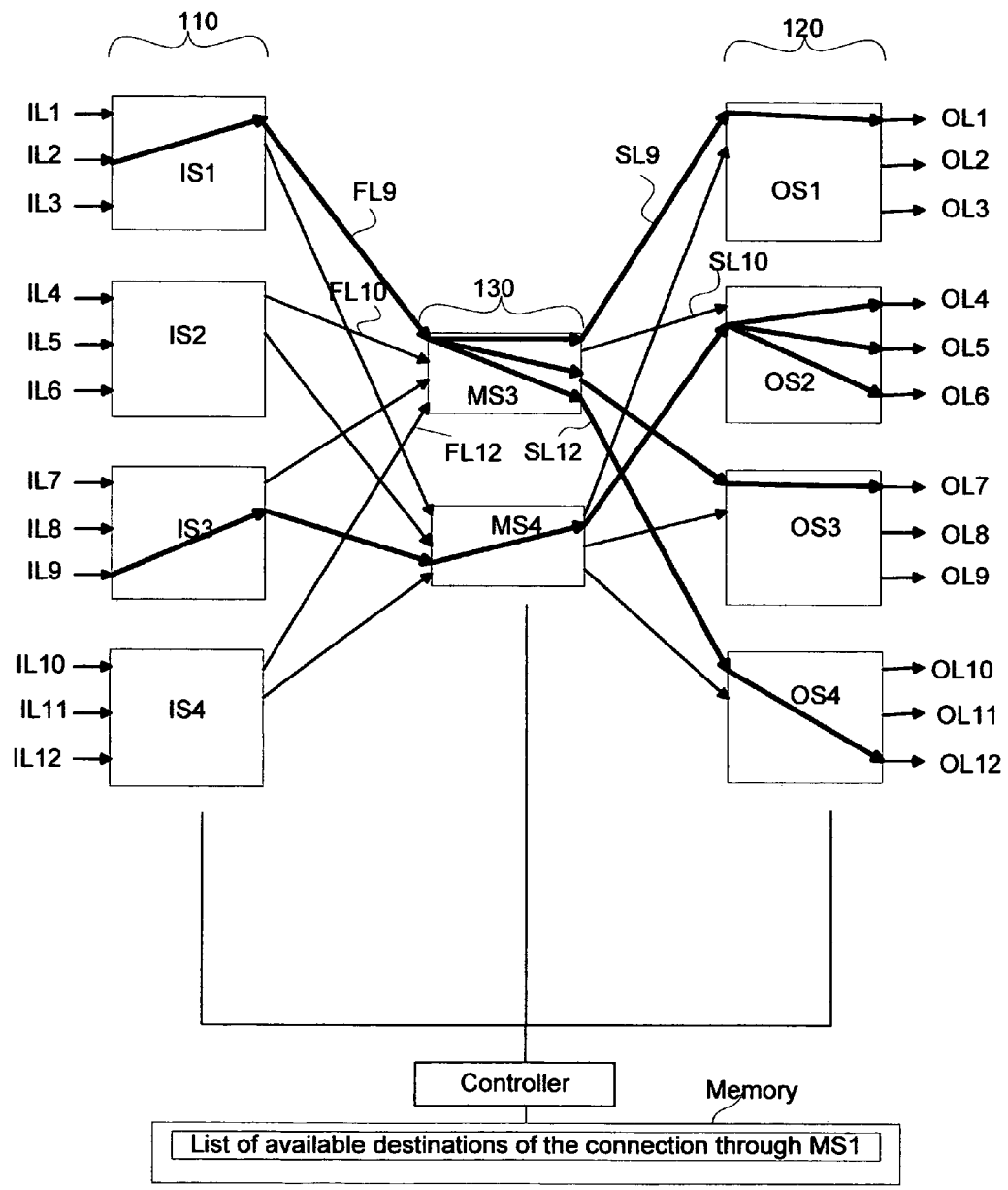
FIG. 6C is the second time step of the TST implementation of the network in FIG. 6A.
Figure 6D:
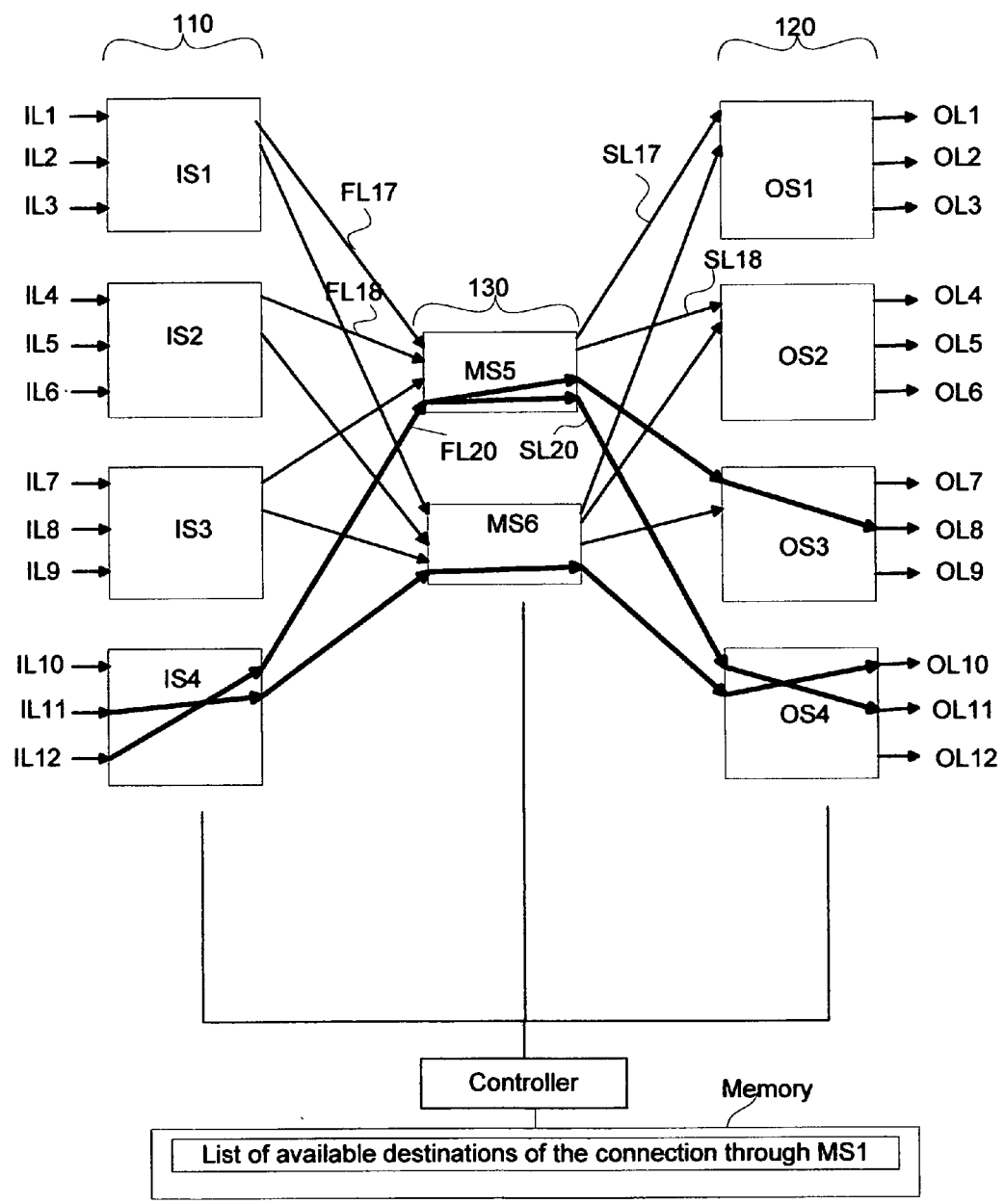
FIG. 6D is the third time step of the TST implementation of the network in FIG. 6A

FIG. 6B, FIG. 6C and FIG. 6D illustrate the implementation of the TST configuration of the V(6,3,4) network of FIG. 6A. According to the current invention, in TST configuration also the multicast assignment is setup by fanning out each connection not more than once in the first stage, with exactly the same the scheduling method as it is performed in SSS configuration. Since in the network of FIG. 6A n=3, the TST configuration of the network of FIG. 6A has n=3 different time steps; and since s=2, the middle stage in the TST configuration implements only 2 middle switches each with 4 first internal links and 4 second internal links as shown in FIG. 6B, FIG. 6C, and FIG. 6D. In the first time step, as shown in FIG. 6B the two middle switches function as MS1 and MS2 of the network of FIG. 6A. Similarly in the second time step, as shown in FIG. 6C the two middle switches function as MS3 and MS4 of the network of FIG. 6A and in the third time step, as shown in FIG. 6D the two middle switches function as MS5 and MS6 of the network of FIG. 6A.

In the first time step, FIG. 6B implements the switching functionality of middle switches MS1 and MS2, and since in the network of FIG. 6A, connections $I_6$ and $I_6$ are fanned out through middle-switches MS1 and MS2 to the output switches OS1 and OS3 respectively, and so connections $I_1$ and $I_6$ are fanned out to destination outlet links OL2, OL3 and OL9 respectively, just exactly the same way they are set up in the network of FIG. 6A in all the three stages. Similarly in the second time step, FIG. 6C implements the switching functionality of middle switches MS3 and MS4, and since in the network of FIG. 6A, connections $I_2$ and $I_9$ are fanned out through middle switches MS3 and MS4 to the output switches {OS1, OS3, OS4} and OS2 respectively, and so connections $I_2$ and $I_9$ are fanned out to destination outlet links {OL1, OL7, OL12} and {OL4, OL5, OL6} respectively, just exactly the same way they are set up in the network of FIG. 6A in all the three stages.

Similarly in the third time step, FIG. 6D implements the switching functionality of middle switches MS5 and MS6, and since in the network of FIG. 6A, connections $I_{11}$ and $I_{12}$ are fanned out through middle switches MS5 and MS6 to the output switches OS4 and {OS3, OS4} respectively, and so connections $I_{11}$ and $I_{12}$ are fanned out to destination outlet links OL10 and {OL8, OL11} respectively, just exactly the same way they are routed in the network of FIG. 6A in all the three stages. In digital cross connects, optical cross connects, and packet or cell switch fabrics since the inlet links and outlet links are used time-division multiplexed fashion, the switching network such as the $V(m,n_1,r_1,n_2,r_2)$ network implemented in TST configuration will save cost, power and space.

In accordance with the invention, the $V(m,n_1,r_1,n_2,r_2)$ network implemented in TST configuration, using the same scheduling method as in SSS configuration i.e., with each connection fanning out in the first stage switch into only one middle stage switch, and in the middle switches and last stage switches it can fan out any arbitrary number of times as required by the connection request, is operable in strictly nonblocking manner with number of middle switches is equal to s, if $m \geq s*MIN(n_1,n_2)$ where s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278].

Numerous modifications and adaptations of the embodiments, implementations, and examples described herein will be apparent to the skilled artisan in view of the disclosure.

For example the current invention can be extended for a $V(m,n_1,r_1,n_2,r_2)$ for $r_2$>278.

For example, in one embodiment, a method of the type described above is modified to set up a multirate multi-stage network as follows. Specifically, a multirate connection can be specified as a type of multicast connection. In a multicast connection, an inlet link transmits to multiple outlet links, whereas in a multirate connection multiple inlet links transmit to a single outlet link when the rate of data transfer of all the paths in use meet the requirements of multirate connection request. In such a case a multirate connection can be set up (in a method that works backwards from the output stage to the input stage), with fan-in (instead of fan-out) of not more than s in the output stage and arbitrary fan-in in the input stages and middle stages. And a three-stage multirate network is operated in strictly nonblocking manner with the exact same requirements on the number of middle stage switches as described above for certain embodiments.

Numerous such modifications and adaptations are encompassed by the attached claims.

What is claimed is:

1. An apparatus, comprising:
a controller configured to establish a new multicast connection within a network without changing a path of an existing multicast connection within the network, the network having:
an input stage comprising $r_1$ input switches, and at least $n_1$ inlet links for each of said $r_1$ input switches for a total of at least $n_1*r_1$ inlet links in said input stage,
an output stage comprising $r_2$ output switches, and at least $n_2$ outlet links for each of said $r_2$ output switches for a total of at least $n_2*r_2$ outlet links in said output stage, and
a middle stage comprising m middle switches, and each middle switch comprising a first internal link connected to each input switch for a total of at least $r_1$ first internal links, each middle switch further comprising a second internal link connected to each output switch for a total of at least $r_2$ second internal links,
the new multicast connection from an inlet link from the at least $n_1*r_1$ inlet links passes through at most s middle switches, and said new multicast connection further passes to at least a portion of the $n_2*r_2$ outlet links from said at most s middle switches,
where $m \geq s*MIN(n_1,n_2)$ and where
s=2 when $r_2$=[9,11],
s=3 when $r_2$=[25,48],
s=4 when $r_2$=[49,99],
s=5 when $r_2$=[100,154],
s=6 when $r_2$=[155,224], and
s=7 when $r_2$=[225,278].

2. The apparatus of claim 1 wherein said $r_1$ input switches and $r_2$ output switches are the same number of switches and $r_1=r_2=r$.

3. The apparatus of claim 1 wherein said $n_1$ inlet links and $n_2$ outlet links are the same number of links and $n_1=n_2=n$, then $m \geq s*n$ where
  s=2 when $r_2$=[9,11],
  s=3 when $r_2$=[25,48],
  s=4 when $r_2$=[49,99]
  s=5 when $r_2$=[00,154],
  s=6 when $r_2$=[55,224], and
  s=7 when $r_2$=[225,278].

4. The apparatus of claim 1, wherein at least one of said input switches, said output switches, and said middle switches further recursively comprises one or more networks.

5. The apparatus of claim 1, wherein the new multicast connection has a plurality of fan-out-split connections through only one middle switch from the middle stage when the plurality of fan-out-split connections is greater than s and less than $r_2/s$.

6. A method, comprising:
  establishing a multicast connection within a network having an input stage with $r_1$ input switches, an output stage with $r_2$ output switches, and a middle stage having m middle switches, each middle switch from the middle stage being connected to each of said $r_1$ input switches through $r_1$ first internal links and each middle switch further comprising at least one link connected to at most d said output switches for a total of at least d second internal links, wherein $1 \leq d \leq r_2$, and said multicast connection has a fan-out f,
  the multicast connection being associated with at least a portion of the output switches, the portion of the output switches being arbitrarily divided into at most s subsets of output switches, where
    s=2 when $r_2$=[9,11],
    s=3 when $r_2$=[25,48],
    s=4 when $r_2$=[49,99],
    s=5 when $r_2$=[100,154],
    s=6 when $r_2$=[155,224], and
    s=7 when $r_2$=[225,278];
  each output switch from the portion of output switches being associated with only one of the subsets; and
  determining whether at least one of the subsets of output switches has an available second internal links to at least one middle switch.

7. The method of claim 6 further comprising:
  determining whether an input switch associated with the multicast connection has an available first internal link to the at least one middle switch.

8. The method of claim 6 further comprising:
  prior to the determining associated with the at least one of the subsets, determining whether all of the portion of output switches are available to the at least one middle switch when
  f<3 if $r_2$=[9,99],
  f<5 if $r_2$=[100,224],
  f<7 if $r_2$=[225,278].

9. The method of claim 6 further comprising:
  repeating said determining when
  f<3 if $r_2$=[9,99],
  f<5 if $r_2$=[100,224],
  f<7 if $r_2$=[225,278].

10. The method of claim 6 further comprising:
  establishing said multicast connection through not more than s middle switches, the s middle switches being selected based on the determining,
  the method further comprising:
  fanning out said multicast connection into not more than said s middle switches.

11. The method of claim 6 wherein the determining and establishing are performed recursively.

12. The method of claim 6, wherein the multicast connection has a plurality of fan-out-split connections through at most one middle switch from the middle stage when the plurality of fan-out-split connections is greater than s and less than $r_2/s$.

13. A network comprising:
  an input stage comprising $r_1$ input switches, and $n_{1w}$ inlet links in input switch w, for each of said $r_1$ input switches such that $w \in [1,r_1]$ and $n_1 = MAX(n_{1w})$;
  an output stage comprising $r_2$ output switches, and $n_{2v}$ outlet links in output switch v, for each of said $r_2$ output switches such that $v \in [1,r_2]$ and $n_2 = MAX(n_{2v})$; and
  a middle stage comprising m middle switches, and each middle switch comprising a first internal link connected to each input switch for a total of at least $r_1$ first internal links, each middle switch further comprising a second internal link connected to each of at most d said output switches for a total of at least d second internal links, wherein $1 \leq d \leq r_2$,
  said network having a new multicast connection established without changing a path of an existing multicast connection within the network, the network being a strictly nonblocking network when $m \geq s*MIN(n_1,n_2)$ and where
    s=2 when $r_2$=[9,11],
    s=3 when $r_2$=[25,48],
    s=4 when $r_2$=[49,99],
    s=5 when $r_2$=[100,154],
    s=6 when $r_2$=[155,224], and
    s=7 when $r_2$=[225,278],
  the new multicast connection passes through at most s middle switches.

14. The network of claim 13 further comprising a controller configured to be coupled to each of said input, output and middle stages, the controller being configured to establish said new multicast connection.

15. The network of claim 13 wherein said $r_1$ input switches and $r_2$ output switches are the same number of switches and $r_1=r_2=r$.

16. The network of claim 13 wherein said $n_1$ inlet links and $n_2$ outlet links are the same number of links and $n_1=n_2=n$, then $m \geq s*n$ where
  s=2 when $r_2$=[9,11],
  s=3 when $r_2$=[25,48],
  s=4 when $r_2$=[49,99],
  s=5 when $r_2$=[100,154],
  s=6 when $r_2$=[155,224], and
  s=7 when $r_2$=[225,278].

17. The network of claim 13 wherein at least one of said input switches, said output switches, and said middle switches further recursively comprises one or more networks.

18. The network of claim 13, wherein the new multicast connection has a plurality of fan-out-split connections through at most one middle switch from the middle stage when the plurality of fan-out-split connections is greater than s and less than $r_2/s$.

* * * * *